US012675693B2

(12) United States Patent (10) Patent No.: US 12,675,693 B2
Wu et al. (45) Date of Patent: Jul. 7, 2026

(54) DATA PROCESSING METHOD AND APPARATUS

(71) Applicant: Tencent Cloud Computing (Beijing) Co., Ltd., Beijing (CN)

(72) Inventors: Jiaxiang Wu, Beijing (CN); Fan Bai, Beijing (CN); Pengcheng Shen, Beijing (CN); Shaoxin Li, Beijing (CN); Jilin Li, Beijing (CN)

(73) Assignee: Tencent Cloud Computing (Beijing) Co., Ltd., Beijing (CN)

( * ) Notice: Subject to any disclaimer, the term of this patent is extended or adjusted under 35 U.S.C. 154(b) by 638 days.

(21) Appl. No.: 18/128,719

(22) Filed: Mar. 30, 2023

(65) Prior Publication Data

US 2023/0237326 A1 Jul. 27, 2023

Related U.S. Application Data

(63) Continuation of application No. PCT/CN2021/108748, filed on Jul. 27, 2021.

(30) Foreign Application Priority Data

Apr. 15, 2021 (CN) .......................... 202110407285.0

(51) Int. Cl.
G06N 3/08 (2023.01)
G06N 3/0464 (2023.01)
(52) U.S. Cl.
CPC ............. G06N 3/08 (2013.01); G06N 3/0464 (2023.01)
(58) Field of Classification Search
CPC ................................. G06N 3/08; G06N 3/0464
See application file for complete search history.

(56) References Cited

U.S. PATENT DOCUMENTS 11,288,573 B2 * 3/2022 Wu .......................... G06N 3/08
2019/0227980 A1 7/2019 McMahan et al.
(Continued)

FOREIGN PATENT DOCUMENTS

CN 102238555 11/2011
CN 108490388 9/2018
(Continued)

OTHER PUBLICATIONS

International Search Report issued Dec. 10, 2021 in International (PCT) Application No. PCT/CN2021/108478.

*Primary Examiner* — Kenneth B Lee, Jr.
(74) *Attorney, Agent, or Firm* — Crowell & Moring LLP

(57) ABSTRACT

The present disclosure relates to data processing method and apparatus. The method includes: acquiring local model parameters respectively corresponding to N local recognition models; acquiring M parameter fusion modes associated with a local model parameter set, and performing parameter fusion on the local model parameter set respectively according to each parameter fusion mode, so as to obtain M alternative global models; and acquiring evaluation indexes of the M alternative global models respectively in a multimedia verification data set, determining a target global model in the M alternative global models according to the evaluation indexes, and transmitting the target global model to N clients, the N clients updating parameters of a local recognition model associated with the target global model according to the target global model respectively, so as to obtain an object recognition model.

20 Claims, 9 Drawing Sheets

(56)     References Cited

U.S. PATENT DOCUMENTS

| | | | |
|---|---|---|---|
| 2019/0279082 A1* | 9/2019 | Moloney ................ | G06V 10/96 |
| 2020/0027033 A1 | 1/2020 | Garg et al. | |
| 2020/0410290 A1* | 12/2020 | Shen ................ | G06V 30/19173 |
| 2021/0365743 A1* | 11/2021 | Sang ...................... | G06N 3/045 |
| 2022/0351039 A1* | 11/2022 | Satheesh Kumar ..... | G06N 3/08 |

FOREIGN PATENT DOCUMENTS

| | | |
|---|---|---|
| CN | 108763362 | 11/2018 |
| CN | 110874484 | 3/2020 |
| CN | 110874637 | 3/2020 |
| CN | 110874648 | 3/2020 |
| CN | 112365007 | 2/2021 |
| CN | 112651511 | 4/2021 |

* cited by examiner

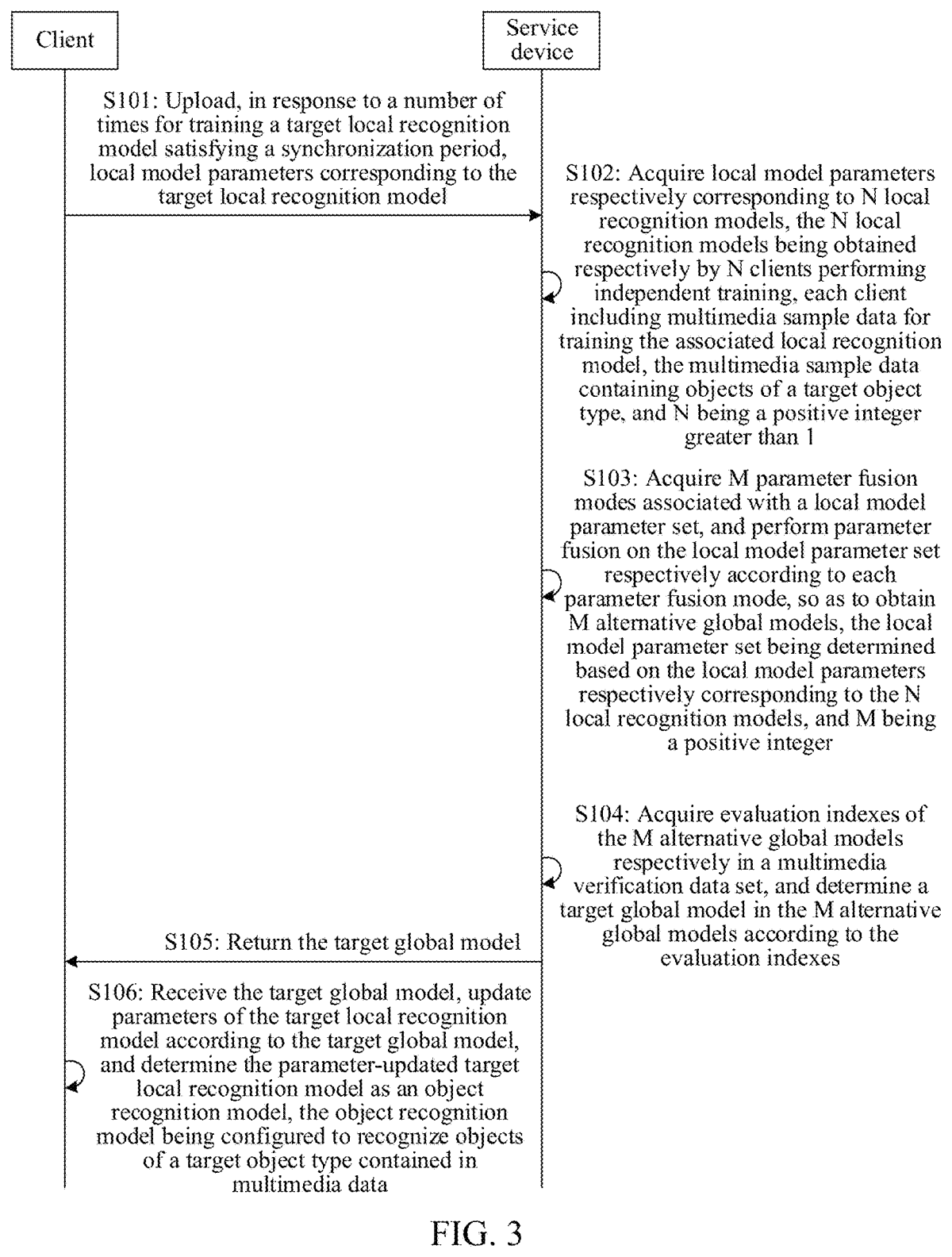

Client

Service device

S101: Upload, in response to a number of times for training a target local recognition model satisfying a synchronization period, local model parameters corresponding to the target local recognition model S102: Acquire local model parameters respectively corresponding to N local recognition models, the N local recognition models being obtained respectively by N clients performing independent training, each client including multimedia sample data for training the associated local recognition model, the multimedia sample data containing objects of a target object type, and N being a positive integer greater than 1

S103: Acquire M parameter fusion modes associated with a local model parameter set, and perform parameter fusion on the local model parameter set respectively according to each parameter fusion mode, so as to obtain M alternative global models, the local model parameter set being determined based on the local model parameters respectively corresponding to the N local recognition models, and M being a positive integer S104: Acquire evaluation indexes of the M alternative global models respectively in a multimedia verification data set, and determine a target global model in the M alternative global models according to the evaluation indexes S105: Return the target global model S106: Receive the target global model, update parameters of the target local recognition model according to the target global model, and determine the parameter-updated target local recognition model as an object recognition model, the object recognition model being configured to recognize objects of a target object type contained in multimedia data

FIG. 3

Identity authentication by face

40b

Align the face with a face verification box, and follow the instruction

Identity authentication by face

40c

In verification...

40a

40d

User A

Face recognition result

Compare

Different                    Same

40e

Identity authentication failure result

Identity authentication pass result

DATA PROCESSING METHOD AND APPARATUS

RELATED APPLICATION

This application is a continuation application of PCT Patent Application No. PCT/CN2021/108748, filed on Jul. 27, 2021, which claims priority to Chinese Patent Application No. 202110407285.0, entitled "DATA PROCESSING METHOD AND APPARATUS, DEVICE, AND MEDIUM" filed on Apr. 15, 2021, wherein the content of the above-referenced applications is incorporated herein by reference in its entirety.

FIELD OF THE TECHNOLOGY

This disclosure relates to the technical field of artificial intelligence, and in particular, to a data processing method and apparatus, a device, and a medium.

BACKGROUND OF THE DISCLOSURE

Federated learning has become a novel training mode to solve the problem of cross-department and even cross-platform data islanding. Model training may be performed to obtain model parameters without giving own data. That is, joint training may be performed while ensuring data privacy. Since the federated learning process needs to be supported by a large amount of data and the data is distributed in different data holders, it is necessary to build a model in conjunction with each data holder. It is necessary to fuse model parameters trained by each data holder when the model is constructed in conjunction with each data holder.

In the related art, each data holder may train a local model using own data. All the data holders may periodically upload local model parameters corresponding to the trained local model to a server. The server performs parameter mean on the local model parameters to obtain a total model. The total model is issued to each data holder to continue local training until a training convergence condition is reached. However, after the parameter mean, the local model parameters of each data holder are less effectively fused, thereby affecting the generalization effect of federated models.

SUMMARY

Embodiments of this disclosure provide a data processing method and apparatus, a device, and a medium, which can improve the effectiveness of parameter fusion between federated training models, thereby improving the generalization effect of federated recognition models.

An aspect of embodiments of this disclosure provides a data processing method, including:

acquiring local model parameters respectively corresponding to N local recognition models, the N local recognition models being obtained respectively by N clients performing independent training, each of the N clients including multimedia sample data for training the associated local recognition model, the multimedia sample data containing objects of a target object type, and N being a positive integer greater than 1;

acquiring M parameter fusion modes associated with a local model parameter set, and performing parameter fusion on the local model parameter set respectively according to each of the M parameter fusion mode, so as to obtain M alternative global models, the local model parameter set being determined based on the local model parameters respectively corresponding to the N local recognition models, and M being a positive integer; and acquiring evaluation indexes of the M alternative global models respectively in a multimedia verification data set, determining a target global model in the M alternative global models according to the evaluation indexes, and transmitting the target global model to N clients, whereby the N clients update parameters of a local recognition model associated with the target global model according to the target global model respectively, so as to obtain an object recognition model, the object recognition model being configured to recognize objects of a target object type contained in multimedia data.

An aspect of embodiments of this disclosure provides a data processing method, including:

in response to a number of times for training a target local recognition model satisfying a synchronization period, uploading local model parameters corresponding to the target local recognition model to a service device, whereby the service device obtains a target global model based on the local model parameters respectively uploaded by N clients, the local model parameters respectively uploaded by the N clients including the local model parameters corresponding to the target local recognition model, the target global model being determined by evaluation indexes of M alternative global models respectively in a multimedia verification data set, the M alternative global models being determined by M parameter fusion modes associated with a local model parameter set and the local model parameter set, the local model parameter set being determined based on the local model parameters respectively uploaded by the N clients, N being a positive integer greater than 1, and M being a positive integer; and receiving the target global model from the service device, updating parameters of the target local recognition model according to the target global model, and determining the parameter-updated target local recognition model as an object recognition model, the object recognition model being configured to recognize objects of a target object type contained in multimedia data.

An aspect of embodiments of this disclosure provides a data processing apparatus, including a memory operable to store computer-readable instructions and a processor circuitry operable to read the computer-readable instructions. When executing the computer-readable instructions, the processor circuitry is configured to:

acquire local model parameters respectively corresponding to N local recognition models, the N local recognition models being obtained respectively by N clients performing independent training, each of the N clients comprising multimedia sample data for training the associated local recognition model, the multimedia sample data containing objects of a target object type, and N being a positive integer greater than 1;

acquire M parameter fusion modes associated with a local model parameter set, and perform parameter fusion on the local model parameter set respectively according to each of the M parameter fusion modes, so as to obtain M alternative global models, the local model parameter set being determined based on the local model parameters respectively corresponding to the N local recognition models, and M being a positive integer;

acquire evaluation indexes of the M alternative global models respectively in a multimedia verification data set;

determine a target global model in the M alternative global models according to the evaluation indexes; and transmit the target global model to the N clients, whereby the N clients update parameters of a local recognition model associated with the target global model according to the target global model respectively, so as to obtain an object recognition model, the object recognition model being configured to recognize objects of a target object type contained in multimedia data.

An aspect of embodiments of this disclosure provides a non-transitory computer-readable storage medium having, stored therein, a computer program adapted to be loaded and executed by a processor, so as to enable a computer device having the processor to perform the method provided in the above aspect of the embodiments of this disclosure.

According to an aspect of this disclosure, a computer program product or computer program is provided. The computer program product or computer program includes computer instructions which are stored in a computer-readable storage medium. A processor of a computer device reads the computer instructions from the computer-readable storage medium. The processor executes the computer instructions, so as to enable the computer device to perform the method provided in the above aspect.

In the embodiments of this disclosure, local model parameters of a local recognition model, which are respectively uploaded by N clients, may be acquired, and M parameter fusion modes for a local model parameter set determined based on the N local model parameters may be acquired. Parameter fusion is performed on the local model parameter set respectively through each parameter fusion mode, so as to obtain M alternative global models. Then, an optimal target global model is selected from the M alternative global models through evaluation indexes of the M alternative global models respectively in a multimedia verification data set. That is, an optimal target global model is selected from the M alternative global models obtained according to the M parameter fusion modes, whereby the fusion efficiency of the N local model parameters can be improved. The N clients continuously update parameters of the respective local recognition models based on the target global model, whereby the generalization effect of the object recognition model can be improved.

BRIEF DESCRIPTION OF THE DRAWINGS

FIG. 3 is a schematic timing diagram of a data processing method according to an embodiment of this disclosure.

DESCRIPTION OF EMBODIMENTS

The technical solutions in embodiments of this disclosure are clearly and completely described in the following with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure without making creative efforts fall within the protection scope of this disclosure.

This disclosure relates to an artificial intelligence (AI) technology, a block chain technology, and a cloud technology.

Figure 1:
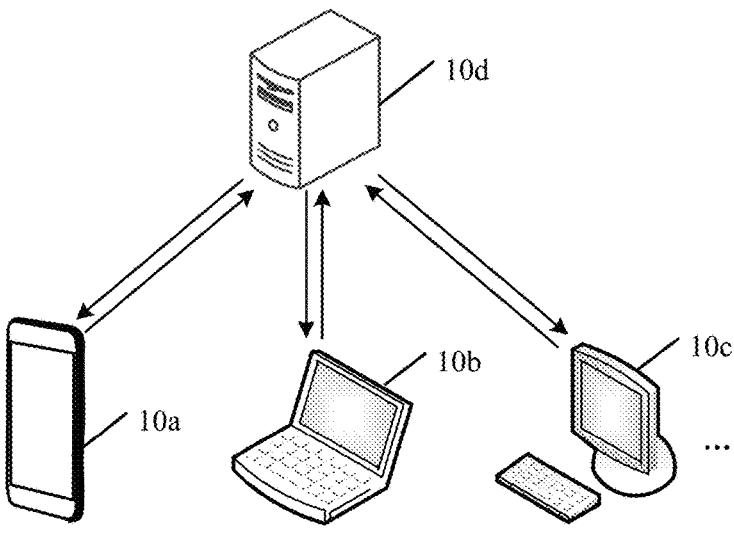
FIG. 1 is a schematic structural diagram of a network architecture according to an embodiment of this disclosure.

FIG. 1 is a schematic structural diagram of a network architecture according to an embodiment of this disclosure. As shown in FIG. 1, the network architecture includes a server 10d and a user terminal cluster. The user terminal cluster includes one or more user terminals. The number of the user terminals is not limited herein. As shown in FIG. 1, the user terminal cluster may include a user terminal 10a, a user terminal 10b, a user terminal 10c, and the like. The server 10d may be an independent physical server, may also be a server cluster or a distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a content delivery network (CDN), and a large data and artificial intelligence platform.

The user terminal 10a, the user terminal 10b, the user terminal 10c, and the like may all include: a smart phone, a tablet computer, a notebook computer, a palmtop computer, a mobile Internet device (MID), a wearable device (for example, a smart watch, a smart band, etc.), a smart television, and other smart terminals with a multimedia data recognition function. As shown in FIG. 1, the user terminal 10a, the user terminal 10b, the user terminal 10c, and the like may be connected to the server 10d over a network respectively, whereby each user terminal may perform data interaction with the server 10d through the network connection.

As shown in FIG. 1, each user terminal in a user terminal cluster may be integrated with a client. There may be one or more clients integrated by each user terminal. As if a user terminal may be integrated with different clients, different clients may hold different multimedia data. The multimedia data held by different clients may all be used for training a recognition model (the multimedia data held by the clients involved in this application are the same type of data by default herein, for example the multimedia data held by different clients are all face image data). Since a large amount of sample data is required to train the recognition model and the multimedia data held by different clients may relate to privacy information or confidential information, that is to say, the multimedia data held by each client cannot be disclosed, the recognition model may be trained by means of federated training.

In other words, each client may take multimedia data held by this client as multimedia sample data for training a recognition model, and independently perform training on the held multimedia sample data. Different clients may periodically synchronize model parameters (the synchronized model parameters may be referred to as local model parameters at this moment). That is, each client may periodically upload the model parameters obtained by training to the server 10d. The server 10d may collect the local model parameters respectively uploaded by each client, and perform parameter fusion on the local model parameters respectively uploaded by each client, so as to obtain a target global model in each period. Then the target global model may be issued to each client. Each client may continue to train the local model parameters according to the target global model until a convergence condition is reached or the number of training iterations reaches a preset maximum number of iterations, so as to obtain an object recognition model after the training is completed. The object recognition model may be configured to recognize objects of a target object type contained in multimedia data, whereby the generalization recognition effect of the object recognition model can be improved. The target object type may include, but is not limited to: object types such as faces, plants, commodities, pedestrians, various animals, and various scenarios.

Figure 2A:
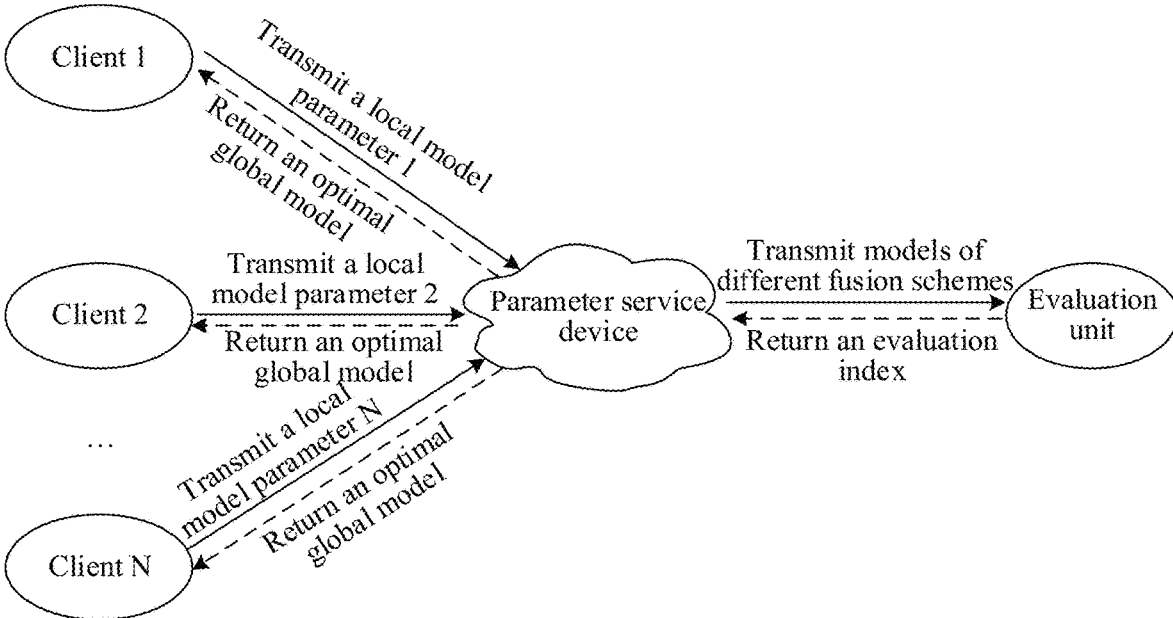
FIGS. 2a and 2b are schematic diagrams of a federated training scenario for a recognition model according to an embodiment of this disclosure.
Figure 2B:
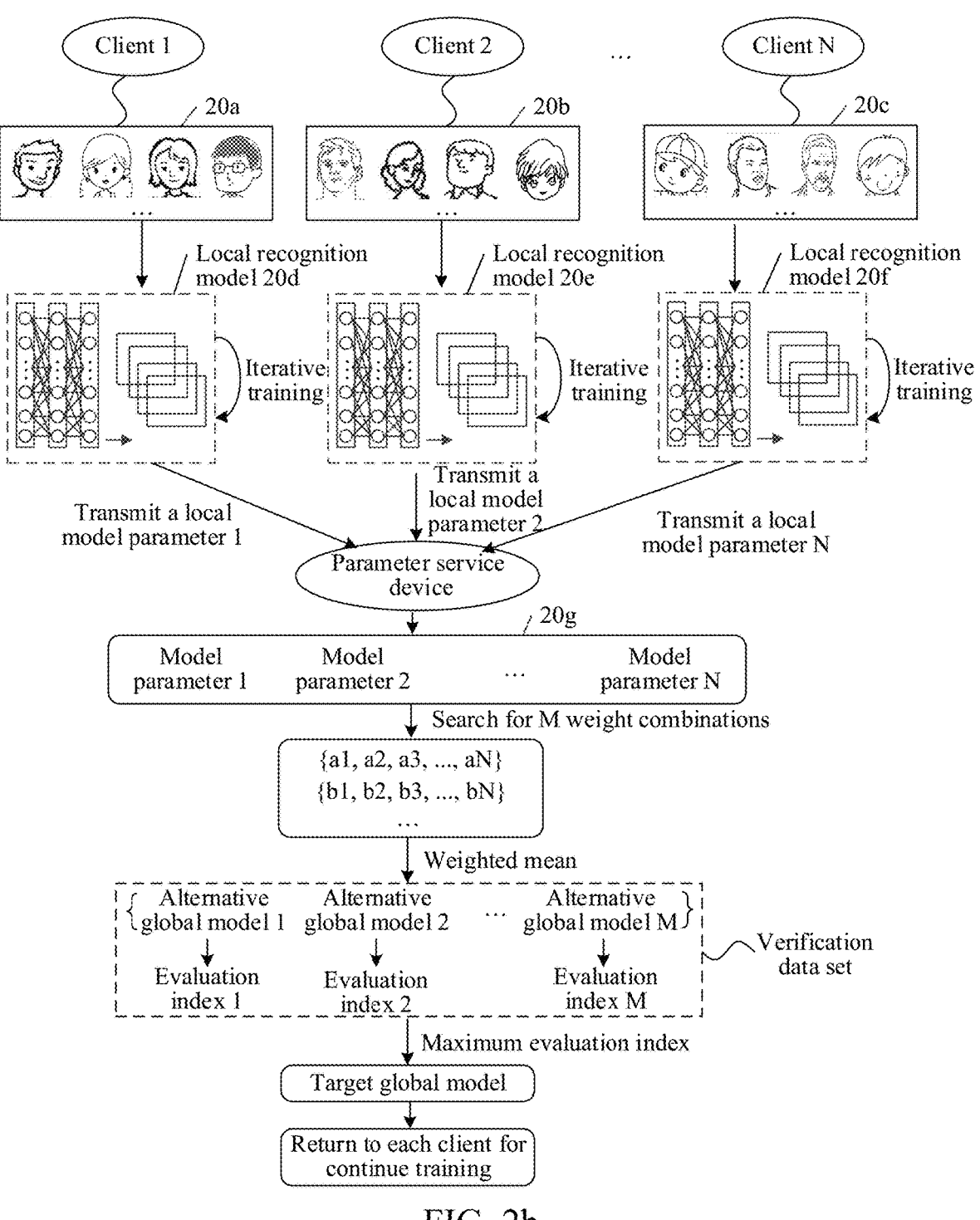

FIGS. 2a and 2b are schematic diagrams of a federated training scenario for a recognition model according to an embodiment of this disclosure. Client 1 as shown in FIGS. 2a and 2b may be a client that has permission to a federated training recognition model and is integrated in the user terminal 10a shown in FIG. 1. Client 2 may be a client that has permission to a federated training recognition model and is integrated in the user terminal 10b shown in FIG. 1. Client N may be a client that has permission to a federated training recognition model and is integrated in the user terminal 10c shown in FIG. 1. A parameter service device may be the server 10d shown in FIG. 1. As shown in FIG. 2a, the number of clients participating in the federated training recognition model is N. The value of N may be a positive integer greater than 1. For example, N may have a value of 2, 3, . . . .

The following describes an example in which the multimedia sample data is face sample data. Each client may hold face sample data for training a recognition model, and the face sample data held by each client is independent from each other. For example, in order to ensure the privacy of data, client 1 does not transmit the face sample data held by this client to another device (for example, client 2, client N, the parameter service device, etc.). Therefore, each client may locally perform local training of the recognition model by using the face sample data held by each client (the recognition model locally trained by the client may be referred to as a local recognition model, and the model parameters trained locally by the client may be referred to as local model parameters).

Since there is a difference between the face sample data used by each client, each client needs to periodically upload the local model parameters to the parameter service device, whereby the parameter service device synchronizes the local model parameters trained by the N clients, namely, performs parameter fusion on the local model parameters trained by the N clients, so as to obtain a global model. For example, if every 100 training iterations (which may also be referred to as number of trainings or number of training steps) are set to one synchronization period, each client needs to upload the local model parameters to the parameter service device once every 100 training iterations.

As shown in FIG. 2a, when the number of training iterations of client 1 on the local recognition model locally reaches 100, client 1 may transmit model parameter 1 obtained by the $100^{th}$ training iteration (namely, a local model parameter obtained by client 1 at the $100^{th}$ training iteration) to the parameter service device. By the same reasoning, when the number of training iterations of client 2 on the local recognition model locally reaches 100, client 2 may transmit model parameter 2 obtained by the $100^{th}$ training iteration to the parameter service device. Client N may transmit model parameter N obtained by this client at the $100^{th}$ training iteration to the parameter service device. After receiving the local model parameters (including model parameter 1, model parameter 2, . . . , model parameter N) obtained at the $100^{th}$ training iteration respectively transmitted by the N clients, the parameter service device may acquire different model parameter fusion schemes (for example, different weight combinations) through a search unit in the parameter service device, and fuse the local model parameters transmitted by the N clients through the foregoing model parameter fusion schemes to obtain an alternative global model. At this moment, the alternative global model may also be understood as a model using different model parameter fusion schemes.

Further, the alternative global model may be transmitted to an evaluation unit (Arbiter). The evaluation unit may be a component integrated inside the parameter service device or an external component having a communicative connection relationship with the parameter service device. In the evaluation unit, an evaluation index corresponding to the alternative global model may be acquired through a verification data set, and the evaluation index corresponding to the alternative global model may be returned to the parameter service device. The verification data set may include face sample data carrying tag information. After face sample data in the verification data set is inputted to the alternative global model, a face recognition result for the face sample data may be outputted through the alternative global model. Furthermore, the outputted face recognition result may be compared with the tag information carried by the face sample data. If the face recognition result is the same as the tag information, a true prediction from the alternative global model is indicated. If the face recognition result is not the same as the tag information, a false prediction from the alternative global model is indicated.

An evaluation index of the alternative global model in the verification data set may be determined according to the face recognition result outputted by the alternative global model. The evaluation index may include, but is not limited to: accuracy (proportion of sample data predicted by the model to be true in all sample data), recall (proportion of sample data predicted by the model to be "real" in all true sample data), precision (proportion of sample data determined to be true in sample data predicted by the model to be "real"), and F1 value (an index designed by considering the accuracy and the recall comprehensively).

The parameter service device may select an optimal alternative global model as a target global model corresponding to a current synchronization period in the alternative global model according to the evaluation index corresponding to the alternative global model, and return the target global model to each client. Each client may update local model parameters locally according to the target global model returned by the parameter service device, and continue training. When each client performs 200 training iterations on a local recognition model locally, the foregoing operations need to be repeatedly executed so as to obtain a target global model corresponding to a subsequent synchronization period to continue training. When the training of the local recognition model reaches a convergence condition or the number of training iterations reaches a set maximum number of iterations, local model parameters at this moment are saved, and a local recognition model containing the current local model parameters may be determined as a local recognition model that completes training. In this disclosure, the local recognition model that completes training may be determined as an object recognition model.

As shown in FIG. 2b, the face sample data held by client 1 constitutes data set 20a, the face sample data held by client 2 constitutes data set 20b, . . . , and the face sample data held by client N constitutes data set 20c. Client 1 may train a local recognition model 20d by using data set 20a locally, client 2 trains a local recognition model 20e by using data set 20b locally, . . . , and client N trains a local recognition model 20f by using data set 20c locally. When the number of training iterations of each client on the local recognition model associated therewith reaches 100, each client needs to transmit a local model parameter obtained by the $100^{th}$ training iteration to the parameter service device. Therefore, the parameter service device may acquire a local model parameter set 20g. The local model parameter set 20g may include the local model parameters respectively transmitted by the foregoing N clients, such as model parameter 1 transmitted by client 1, model parameter 2 transmitted by client 2, . . . , and model parameter N transmitted by client N.

Further, the parameter service device may acquire M weight combinations for the local model parameter set 20g through the search unit (the value of M may be a positive integer, for example, M may have a value of 1, 2, 3, . . . ). At this moment, the M weight combinations may refer to M model parameter fusion modes selected by the search unit for the local model parameter set 20g. Each weight combination may include a training influence weight respectively corresponding to a local model parameter contained in the local model parameter set 20g. That is to say, each weight combination may be understood as an N-dimensional vector. For example, the foregoing M weight combinations may include: {a1, a2, a3, . . . , aN}, and {b1, b2, b3, . . . , bN}. Then parameter fusion may be performed on the local model parameter set 20g according to each weight combination, so as to obtain M alternative global models.

In an evaluation unit, evaluation indexes respectively corresponding to M alternative global models are acquired through a verification data set. For example, an evaluation index corresponding to an alternative global model 1 in the verification data set is: an evaluation index 1, an evaluation index corresponding to an alternative global model 2 in the verification data set is: an evaluation index 2, . . . , and an evaluation index corresponding to an alternative global model M in the verification data set is: an evaluation index M. An alternative global model corresponding to the maximum evaluation index is selected from the M alternative global models as a target global model corresponding to a current synchronization period. Then, the target global model is issued to N clients. After receiving the target global model issued by the parameter service device, any client may update local model parameters locally according to the target global model, and then continue training based on the updated local model parameters. When the number of training iterations reaches a next synchronization period (for example, the $200^{th}$ training iteration), the foregoing operations may be repeated until the training process of the local recognition model is completed.

It is to be understood that the N clients perform federated training on the same recognition model. That is, initialization recognition models used before federated training are the same, and the maximum number of iterations, the synchronization period, the training method used, and other information in the federated training process are all the same. After the federated training is completed, object recognition models obtained by all the clients may be the same, or there may be some differences related to the differences between the face sample data held by all the clients. For example, after determining a target global model 50 in the $50^{th}$ synchronization period, the parameter service device issues the target global model to each client. Each client may update parameters of a local recognition model associated therewith according to the target global model 50. At this moment, the local recognition models of the various clients are the same. Each client may continue training the local recognition model based on the face sample data held by each client. If convergence is reached when the 51st synchronization period is not reached or the number of training iterations reaches the set maximum number of iterations, the object recognition model is acquired after the training is completed. That is, local model parameters obtained after the $50^{th}$ synchronization period are not fused, and therefore the object recognition models finally obtained by the various clients may have some differences. With the embodiments of this disclosure, the effectiveness of parameter fusion between local model parameters can be improved in a federated training process, thereby improving the generalization effect of object recognition models.

FIG. 3 is a schematic timing diagram of a data processing method according to an embodiment of this disclosure. It is to be understood that the data processing method may be performed interactively by a client and a service device. The client may be a client integrated by any one of the user terminals in the user terminal cluster shown in FIG. 1. The service device may be an independent server (for example the server 10d shown in FIG. 1), or a server cluster composed of a plurality of servers, or a user terminal, etc. As shown in FIG. 3, the data processing method may include the following steps:

Step S101: In response to the number of times for training a target local recognition model satisfying a synchronization period, the client uploads local model parameters corresponding to the target local recognition model.

When the multimedia data held by N clients (the value of N may be a positive integer greater than 1) are the same type of data and the multimedia data held by the N clients relate to data privacy and data security, it means that the multimedia data held by the N clients cannot be summarized. If it is necessary to use the multimedia data held by the N clients to train the recognition model, the recognition model may be trained by means of federated training under the premise of ensuring the data security and privacy of each client. In the federated training, the multimedia data held by the N clients may all be used as multimedia sample data. Illustratively, the multimedia sample data may include face image data, user financial data, surveillance video data, user commodity data, etc. Each multimedia sample data may contain objects of a target object type. The target object type may include object types of faces, pedestrians, commodities, etc.

The N clients may use own multimedia data to train independently locally. The recognition model trained independently by each client may be referred to as a local recognition model. Each client may periodically upload the local recognition model parameters trained independently for synchronization. In the embodiments of this disclosure, a synchronization period may be set according to actual requirements. For example, the synchronization period may be set to K trainings (which may also be referred to as training steps), which means that every K training steps of the local recognition model in the client, local model parameters corresponding to the local recognition model need to be uploaded to a service device (such as the parameter service device in the embodiment corresponding to FIG. 2a) for synchronization. The value of K is a positive integer greater than 1. For example, the value of K may be 100, 400, 1600, etc. The training process of the local recognition model for each of the N clients is similar, except that the multimedia sample data used is different. In the following, any one of the N clients is selected as a target client. The training process of the local recognition model is described by taking the target client as an example.

The target client may acquire multimedia sample data held by this target client, and input the multimedia sample data into a target local recognition model (the target local model here refers to a local recognition model for the target client to perform independent training locally). An object space feature corresponding to the multimedia sample data may be outputted through the target local recognition model. Illustratively, in the process of training the target local recognition model, the target client may read the multimedia sample data held by this target client, and compose the read multimedia sample data into a batch. The multimedia sample data contained in the batch may be inputted into the target local recognition model. The target local recognition model may be a convolution neural network. At this moment, the target local recognition model may include network layers such as a convolution layer, a non-linear activation layer (rectified linear unit (ReLU) layer), and a pooling layer.

After the multimedia sample data is inputted into the target local recognition model, operations such as convolution calculation (performing convolution calculation through the convolution layer), non-linear activation function calculation (performing non-linear activation function calculation through the non-linear activation layer) and pooling calculation (performing pooling calculation through the pooling layer) may be performed on the multimedia sample data in the target local recognition model. Object space features corresponding to the multimedia sample data are outputted. That is, the object space features in the multimedia sample data may be extracted through the target local recognition model. In a $k^{th}$ training process, the multimedia sample data contained in the foregoing batch may be represented as $X_k$. The target client may perform iterative training by means of gradient descent (GD). The gradient descent is an iterative learning algorithm, which may use multimedia sample data to update local model parameters of the target local recognition model. The size (also referred to as a batch size) of the batch is a super-parameter of the gradient descent. The number of training samples is controlled before internal parameters of the target local recognition model are updated.

Further, the target client may determine a training loss function corresponding to the target local recognition model according to tag information corresponding to the object space feature and the multimedia sample data, and then may determine a training gradient of the target local recognition model according to the training loss function, update parameters of the target local recognition model according to the training gradient and a training learning rate corresponding to the target local recognition model, and statistically calculate the number of trainings corresponding to the target local recognition model.

In other words, the target client may calculate s training loss corresponding to a training loss function according to the object space feature extracted by the target local recognition model and the tag information carried by the multimedia sample data. After the training loss calculation is completed, a training gradient $g=\nabla L(\theta, x_k)$ may be calculated according to a chain rule, where L is the training loss function, $\nabla$ represents the gradient calculation, and $\theta$ may be used for representing the local model parameters trained by the target client. The training loss function may be a classification function (for example, a softmax function), and may also be a CosFace function (a loss function that maximizes the inter-class difference and minimizes the intra-class difference by normalizing and maximizing cosine decision boundaries) and an ArcFace function (a loss function that optimizes an inter-class distance from an anti-cosine space such that cos has a smaller value on a monotonic interval by adding m to an included angle).

After the training gradient of the target local recognition model is determined, a training learning rate corresponding to the target local recognition model may be acquired, and the local model parameters of the target local recognition model are updated according to the training learning rate and the training gradient. The update mode may be represented as: $\theta_{a,r,k+1} \leftarrow \theta_{a,r,k} - \eta_r \nabla L(\theta_{a,r,k}, x_{a,r,k})$, where $\theta_{a,r,k}$ may be represented as local model parameters obtained by a $k^{th}$ training of a target local recognition model (namely, a local recognition model independently trained by an $a^{th}$ client in N clients, where a is a positive integer less than or equal to N) in an $r^{th}$ synchronization period, $x_{a,r,k}$ may be represented as multimedia sample data used by the $k^{th}$ training of the target local recognition model in the $r^{th}$ synchronization period, $\eta_r$ may be represented as a training learning rate of the target local recognition model in the $r^{th}$ synchronization period, $\nabla L(\theta_{a,r,k}, x_{a,r,k})$ may be represented as a training gradient of the target local recognition model in the $k^{th}$ training of the $r^{th}$ synchronization period, and $\theta_{a,r,k+1}$ may be represented as local model parameters obtained by a $(k+1)^{th}$ training of the target local recognition model in the $r^{th}$ synchronization period. The local model parameters $\theta_{a,r,k+1}$ in the $(k+1)^{th}$ training are updated based on the local model parameters $\theta_{a,r,k}$ in the $k^{th}$ training, and the product of the training gradient $\nabla L(\theta_{a,r,k}, x_{a,r,k})$ and the training learning rate $\eta_r$.

The training may be terminated when the number of training iterations reaches a set maximum number of iterations, which indicates that the training process for the target local recognition model is completed. Each time the local model parameters are updated according to $\theta_{a,r,k+1} \leftarrow \theta_{a,r,k} - \eta_r \nabla L(\theta_{a,r,k}, x_{a,r,k})$, the number of times for training the target local recognition model may be increased once, namely, the target client may statistically calculate the number of times for training the target local recognition model in real time.

When the number of times for training the target local recognition model satisfies the synchronization period, namely, the number of times for training the target local recognition model is a multiple of the foregoing synchronization period K, the current local model parameters of the target local recognition model may be transmitted to the service device. For example, assuming that the synchronization period K is 100, when the number of times for training the target local recognition model is 100, the local model parameters obtained by the $100^{th}$ training need to be transmitted to the service device for synchronization. When the number of times for training the target local recognition model is 200, the local model parameters obtained by the $200^{th}$ training may be transmitted to the service device for synchronization. By parity of reasoning, the training of the target local recognition model is terminated until the number of times for training the target local recognition model reaches the set maximum number of iterations.

It is to be understood that the foregoing N clients may all perform the foregoing operations. When the number of times for training the local recognition model associated therewith satisfy the synchronization period, the local model parameters of the associated local recognition model may all be transmitted to the service device.

Step S102: The service device acquires local model parameters respectively corresponding to N local recognition models. The N local recognition models are obtained respectively by N clients performing independent training. Each client includes multimedia sample data for training the associated local recognition model. The multimedia sample data contains objects of a target object type. N is a positive integer greater than 1.

After the N clients respectively transmit the local model parameters of the local recognition models respectively associated therewith to the service device, the service device may acquire the local model parameters respectively corresponding to the N local recognition models. Each local recognition model may correspond to a client. The N local recognition models may be independently trained in different clients. Multimedia sample data held by each client for training the local recognition model is not disclosed to the outside world. In the embodiments of this disclosure, considering the actual physical delay between different clients and the overall training efficiency, the synchronization period K (which may also be referred to as a synchronization interval) may be set to a value of hundreds or thousands. Local model parameters of a local recognition model rather than a gradient at each training iteration are synchronized between a client and a service device, thereby improving the efficiency of federated training.

Step S103: The service device acquires M parameter fusion modes associated with a local model parameter set, and performs parameter fusion on the local model parameter set respectively according to each parameter fusion mode, so as to obtain M alternative global models. The local model parameter set is determined based on local model parameters respectively corresponding to the N local recognition models. M is a positive integer.

After acquiring the local model parameters respectively transmitted by the N clients, the service device determines a local model parameter set based on the local model parameters uploaded by the N clients (such as the local model parameter set 20g in the embodiment corresponding to FIG. 2b).

In some embodiments, the manner of determining a local model parameter set based on the local model parameters respectively corresponding to the N local recognition models includes: taking a set including the local model parameters respectively corresponding to the N local recognition models as a local model parameter set; or, selecting local model parameters respectively corresponding to L (L is a positive integer less than N) local recognition models from the local model parameters respectively corresponding to the N local recognition models, and taking a set including the local model parameters respectively corresponding to the L local recognition models as a local model parameter set. The embodiments of this disclosure do not define the manner of selecting local model parameters respectively corresponding to L local recognition models from the local model parameters respectively corresponding to the N local recognition models. Illustratively, local model parameters respectively corresponding to L local recognition models are selected from the local model parameters respectively corresponding to the N local recognition models in different manners. Or, local model parameters respectively corresponding to L local recognition models are empirically selected from the local model parameters respectively corresponding to the N local recognition models.

Illustratively, the local model parameters transmitted by the N clients respectively may be represented as: $\theta_j$, where $j \in \{1, 2, \ldots, N\}$. The foregoing local model parameter set may include the local model parameters respectively corresponding to the N clients, and may also include local model parameters corresponding to L clients of the N clients, where L is a positive integer less than N.

The service device may perform parameter fusion on each local model parameter contained in the local model parameter set by using different parameter fusion modes, acquire M (M is a positive integer) parameter fusion modes associated with the local model parameter set after determining the local model parameter set, and then perform parameter fusion on the local model parameters respectively according to each parameter fusion, so as to obtain M alternative global models. An alternative global model may be obtained according to each parameter fusion mode.

Illustratively, the parameter fusion mode is a mode that may be utilized under a parameter fusion scheme including, but not limited to, a global weighted mean scheme, a voting scheme, a mean scheme, etc. That is, the parameter fusion of the local model parameter set may be performed by using the parameter fusion mode under the global weighted mean scheme, or the parameter fusion of the local model parameter set may be performed by using the parameter fusion mode under the voting scheme or the parameter fusion mode under the mean scheme. Illustratively, the M parameter fusion modes may include parameter fusion modes under one or more parameter fusion schemes.

The embodiments of this disclosure illustrate the parameter fusion of the local model parameter set based on the global weighted mean scheme. That is, the M parameter fusion modes are parameter fusion modes under the global weighted mean scheme. In this case, a parameter fusion mode is implemented based on a weight combination. The service device may find an optimal weight combination for the local model parameter set in a search space, and perform weighted mean on the optimal weight combination and the local model parameter set to obtain an optimal global model. The service device may acquire M weight combinations associated with the local recognition model parameter set, and perform parameter fusion on the local model parameter set respectively according to each weight combination, so as to obtain the M alternative global models. Each weight combination includes a training influence weight respectively corresponding to each local model parameter in the local model parameter set.

Illustratively, for any weight combination i in the M weight combinations, the process of performing parameter fusion on the local model parameters according to the weight combination i is: performing weighted mean on a training influence weight contained in the weight combination i and each local model parameter contained in the local model parameter set to obtain a fused model parameter, and determining a recognition model carrying the fused model parameter as an alternative global model i associated with the weight combination i.

If the local model parameter set includes local model parameters respectively corresponding to N clients, a weight combination may include training influence weights respectively corresponding to the N local model parameters. For any one weight combination i in the M weight combinations, weighted mean may be performed on a training influence weight contained in the weight combination i and the N local model parameters contained in the local model parameter set to obtain a fused model parameter, and a recognition model carrying the fused model parameter is determined as an alternative global model i associated with the foregoing weight combination i, where i is a positive integer less than or equal to M.

In other words, the service device may randomly generate, in each synchronization process, M weight combinations associated with the local recognition model parameter set. The M weight combinations may be represented as:

$$\{\mathcal{D}_w^1, \mathcal{D}_w^2, \cdots, \mathcal{D}_w^M\}.$$

At this moment, any one weight combination $$\mathcal{D}_w^i$$

(namely, the foregoing weight combination i) in the M weight combinations may include training influence weights respectively corresponding to N local model parameters, and the sum of all the training influence weights contained in each weight combination $$\mathcal{D}_w^i$$

is 1. The training influence weights in the weight combination $$\mathcal{D}_w^i$$

may be represented as wa, where a∈{1, 2, . . . , N}, and all the training influence weights in the weight combination $$\mathcal{D}_w^i$$

satisfy the condition $$\sum_{a=1}^N w_a = 1.$$

Then weighted mean may be performed on the N training influence weights contained in the weight combination $$\mathcal{D}_w^i$$

and the N local model parameters contained in the local recognition model parameter set to obtain a fused model parameter. At this moment, a recognition model carrying the fused model parameter is determined as an alternative global model $\bar{\theta}_i$ (namely, the foregoing alternative global model i), namely $$\bar{\theta}_i = \sum_{a=1}^N w_a \cdot \theta_a.$$

Based on the foregoing operation process, M alternative global models may be obtained. The M alternative global models may be represented as: $\{\bar{\theta}_1, \bar{\theta}_2, \ldots, \bar{\theta}_m\}$.

Illustratively, in the case where the local model parameter set includes local model parameters respectively corresponding to N local recognition models, any one weight combination i in the foregoing M weight combinations may be acquired according to the following process. The service device samples N values within a target value range, determines the sum of absolute values corresponding to the N values as a norm value, and determines a ratio of each of the N values to the norm value as a weight combination i associated with the local model parameter set. Illustratively, N values may be sampled on a [0, 1] uniform distribution, and these N values are combined into an N-dimensional vector. Then the N values may be divided by an L1 norm of the vector (namely, the sum of absolute values corresponding to the N values) so as to ensure that the sum of the N values obtained is 1, and a weight combination i may be obtained. This process may be referred to as a normalization operation. By parity of reasoning, M weight combinations may be obtained by repeating the foregoing operation M times.

The model parameter fusion scheme may also adopt a partial local fusion scheme. In a federated training scenario of N clients, local model parameters of L clients may be randomly selected at each synchronization for fusion, so as to increase the randomness in the process of model parameter fusion. That is, the local model parameters respectively corresponding to the L clients may be selected from the N clients at each synchronization. At this moment, the local model parameter set may include the local model parameters respectively corresponding to the L clients. If the local model parameter set includes L local model parameters, M weight combinations associated with the local recognition model parameter set may be obtained, and one weight combination may include training influence weights respectively corresponding to the L local model parameters. That is, each weight combination at this moment may refer to an L-dimensional vector, and the sum of the L training influence weights contained in each weight combination is 1. The acquisition mode of the M weight combinations and the parameter fusion process of the L local model parameters are the same as the operation in the case where the foregoing local model parameter set includes local model parameters respectively corresponding to N clients. The description thereof will not be repeated herein.

Step S104: The service device acquires evaluation indexes of the M alternative global models respectively in a multimedia verification data set, and determines a target global model in the M alternative global models according to the evaluation indexes.

The service device may acquire, in the evaluation unit, a multimedia verification data set containing positive sample pairs and negative sample pairs. The positive sample pairs refer to multimedia sample data pairs containing the same object (for example, same person sample pairs). The negative sample pairs refer to multimedia sample data pairs containing different objects (for example, non-same person sample pairs).

An alternative global model i (any one of M alternative global models) is acquired from the M alternative global models. The positive sample pairs are inputted to the alternative global model i. First object prediction results of the positive sample pairs may be outputted through the alternative global model i. The negative sample pairs are inputted to the alternative global model i. Second object prediction results of the negative sample pairs may be outputted through the alternative global model i. Then an evaluation index of the alternative global model i in the multimedia verification data set may be determined according to the first object prediction results and the second object prediction results. In other words, the service device may sequentially input each sample pair (a positive sample pair and a negative sample pair) contained in the multimedia verification data set into the alternative global model i. A prediction result respectively corresponding to each positive sample pair may be outputted through the alternative global model i. An evaluation index of the alternative global model i in the multimedia verification data set may be determined according to the prediction result.

An evaluation index of each of the foregoing M alternative global models respectively in the multimedia verification data set may be acquired in the foregoing manner, thereby determining a target global model in the M alternative global models according to the evaluation index. Illustratively, an alternative global model corresponding to the largest evaluation index is determined as the target global model from the M alternative global models.

Illustratively, when the evaluation index is accuracy, the evaluation index may be determined according to the following process. The service device statistically calculates a first number of true predictions of the alternative global model i in the positive sample pairs according to the first object prediction results. A second number of true predictions of the alternative global model i in the negative sample pairs is statistically calculated according to the second object prediction results. The sum of the first number of true predictions and the second number of true predictions is determined as a total number of predicted true sample pairs of the alternative global model i in the multimedia verification data set. A total number of sample pairs corresponding to the multimedia verification data set is acquired, and an evaluation index of the alternative global model i in the multimedia verification data set is determined according to a ratio of the total number of predicted true sample pairs to the total number of sample pairs.

In other words, according to the prediction result of the alternative global model i in the multimedia verification data set, a first number of true predictions of the alternative global model i in the positive sample pair (which may refer to the number of true predictions and positive sample pairs per se, and may also be referred to as true positive, TP), a first number of false predictions of the alternative global model i in the positive sample pair (which may refer to the number of false predictions and positive sample pairs per se, and may also be referred to as false negative, FN), a second number of true predictions in the negative sample pair (which may refer to the number of true predictions and negative sample pairs per se, and may also be referred to as true negative, TN), and a second number of false predictions in the negative sample pair (which may refer to the number of false predictions and negative sample pairs per se, and may also be referred to as false positive, FP) may be statistically calculated. The evaluation index (accuracy) of the alternative global model i in the multimedia verification data set may be represented as: acc=(TP+TN)/(TP+FN+TN+FP), where TP+FN+TN+FP may be represented as the total number of sample pairs contained in the multimedia verification data set, and TP+TN may be represented as the number of truly predicted sample pairs of the alternative global model i in the multimedia verification data set.

Optionally, when there are P multimedia verification data sets, the P multimedia verification data sets may include a multimedia verification data set j, where P is a positive integer, and j is a positive integer less than or equal to P. At this moment, the evaluation index may be determined according to the following process. The service device may determine a ratio of a total number (TP+TN) of predicted true sample pairs of the alternative global model i in the multimedia verification data set j to a total number (TP+FN+TN+FP) of sample pairs corresponding to the multimedia verification data set j as a prediction accuracy of the alternative global model i in the multimedia verification data set j, namely acc=(TP+TN)/(TP+FN+TN+FP). Then prediction accuracies of the alternative global model i respectively in the P multimedia verification data sets may be acquired, and a mean accuracy mean corresponding to the P prediction accuracies and a standard difference std corresponding to the P prediction accuracies are statistically calculated. An evaluation index $\overline{acc}$ of the alternative global model i in the multimedia verification data set is determined according to the mean accuracy and the standard difference. The calculation mode for the evaluation index $\overline{acc}$ may be represented as:

$$\overline{acc} = \sum \frac{(acc_j - \text{mean})}{std}, \text{mean} = \frac{1}{P}\sum acc_j, \tag{1}$$

$$std = \sqrt{\frac{\sum(acc_j - \text{mean})^2}{P}},$$

where $\overline{acc}$ in the foregoing formula (1) may be represented as a unified prediction accuracy (namely, the foregoing evaluation index) obtained by normalizing the prediction accuracies of the alternative global model i in the P multimedia verification data sets; $acc_j$ may be represented as the prediction accuracy of the alternative global model i in the multimedia verification data set j; mean may be represented as the mean accuracy corresponding to the prediction accuracies of the alternative global model i in the P multimedia verification data sets; and std may be represented as the standard difference corresponding to the prediction accuracies of the alternative global model i in the P multimedia verification data sets.

It is to be noted that the foregoing M weight combinations and the foregoing evaluation indexes may be processed by using different normalization methods, and the normalization methods may include but are not limited to: L-norm and M-norm. Certainly, the embodiments of this disclosure may also not perform normalization operations.

Optionally, an evaluation index (for example, the foregoing prediction accuracy) of an alternative global model $\overline{\theta}_i$ in the multimedia verification data set j may be represented as $S_j$, where $j \in \{1, 2, \ldots, P\}$. Then the initial evaluation index $S_j$ is normalized so as to eliminate the influence of the difference between the multimedia verification data sets. For example, the initial evaluation index $S_j$ may be locally normalized (Local Norm):

$$S'_j = \frac{S_j}{\sqrt{\sigma^2(S_j) + \epsilon}}, \qquad (2)$$

where $$S'_j$$

in the foregoing formula (2) may be represented as the locally normalized evaluation index, $\sigma$ may be represented as an activation function, $\epsilon$ may be a super-parameter in the training process, and the super-parameter $\epsilon$ may be set according to actual requirements.

Optionally, the initial evaluation index $S_j$ may be movably normalized (Moving Norm):

$$\mu = (1 - \gamma)\mu_{last} + \gamma \bar{S}_j, \qquad (3)$$

$$v = (1 - \gamma)v_{last} + \gamma \cdot \frac{\sum_{s \in S_j}(s - \mu)^2}{|S_j|}, \qquad (4)$$

$$S'_j = \frac{S_j}{\sqrt{v + \epsilon}}, \qquad (5)$$

where $$S'_j$$

in the foregoing formulas (3) to (5) may be represented as the movably normalized evaluation index, $\gamma$ may be represented as a normalization parameter, $\mu$ may be represented as a moving mean value, $v$ may be represented as a moving variance, $\epsilon$ may be a super-parameter in the training process, $\mu_{last}$ may be a moving mean value corresponding to the latest training, and $v_{last}$ may be a moving variance corresponding to the latest training. The super-parameter $\epsilon$ in the formula (5) and the super-parameter $\epsilon$ in the foregoing formula (2) may be the same or different.

Further, after obtaining the evaluation indexes respectively corresponding to the M alternative global models through the foregoing formula (2), or the foregoing formulas (3) to (5), a weight combination corresponding to the largest evaluation index in the M evaluation indexes may be taken as an optimal weight combination, and the optimal weight combination is applied to the local recognition model corresponding to each client.

$$\hat{a} = \arg_a \max \sum_{i=1}^{P} S'_{j,a}, \qquad (6)$$

$$w = (1 - \varphi)w_{last} + \varphi\hat{w}_{\hat{a}}, \qquad (7)$$

where $$S'_{j,a}$$

in the foregoing formulas (6) and (7) may be represented as evaluation indexes of a local recognition model corresponding to an $a^{th}$ client in the multimedia verification data set j, $\hat{a}$ may be represented as applying an optimal weight combination to the local recognition model of the $a^{th}$ client, $a \in \{1, 2, \ldots, N\}$, and $\hat{w}_a$ may be represented as a training influence weight of an $a^{th}$ local recognition model (the local recognition model corresponding to the $a^{th}$ client) determined based on the foregoing optimal weight combination; $w_{last}$ may be a weight corresponding to the latest training of the local recognition model of the $a^{th}$ client, and $\varphi$ may be a super-parameter in the training process. The super-parameter $\varphi$ may be set according to actual requirements.

Optionally, when the evaluation index is a corresponding recall rate (TPR) under a fixed false acceptance rate (FAR), the service device may acquire a false acceptance rate of the alternative global model i contained in the M alternative global models in the multimedia verification data set, and determine a similarity threshold in a similarity corresponding to the negative sample pairs. The similarity threshold is determined by the number of negative sample pairs and the false acceptance rate. Then a similarity corresponding to the positive sample pairs may be acquired, first sample pairs having a similarity greater than the similarity threshold are acquired in the positive sample pairs, and a ratio of the number of the first sample pairs to the number of the positive sample pairs is determined as an evaluation index corresponding to the alternative global model i.

Illustratively, the false acceptance rate may be determined according to the following process. A number of false predictions (namely, the foregoing second number of false predictions, FP) of the alternative global model i contained in the M alternative global models in the negative sample pairs is acquired. A ratio of the number of false predictions to the number of the negative sample pairs (the sum of the second number of false predictions and the second number of true predictions, namely FP+TN) is determined as a false acceptance rate of the alternative global model i in the multimedia verification data set. The false acceptance rate may be represented as: FAR=FP/(FP+TN).

For example, if the multimedia verification data set includes N1 positive sample pairs and N2 negative sample pairs, the recall rate TPR calculation method at FAR=1e−3 is: acquiring similarities (for example, a cosine similarity) between the N2 negative sample pairs and similarities between the N1 positive sample pairs, performing descending ordering on the similarities of the N2 negative sample pairs, determining a topx=int(N2*FAR)$^{th}$ similarity as a similarity threshold, determining, in the N1 positive sample pairs, a positive sample pair having the similarity greater than the similarity threshold as a first sample pair, and determining a ratio of the number of the first sample pairs to the number N1 of the positive sample pairs as a recall rate TPR (namely, the foregoing evaluation index), where int( ) is a rounding function, and FAR=1e−3 may refer to a value preset based on actual demands.

It is to be understood that the service device may determine the alternative global model corresponding to the maximum evaluation index as a target global model according to the evaluation indexes of the M alternative global models respectively in the multimedia verification data set, and a weight combination corresponding to the target global model is determined as an optimal weight combination in the M weight combinations. In different synchronization processes, the optimal weight combinations are different. For example, the optimal weight combinations determined in the first synchronization process and the second synchronization process are different.

Figure 4:
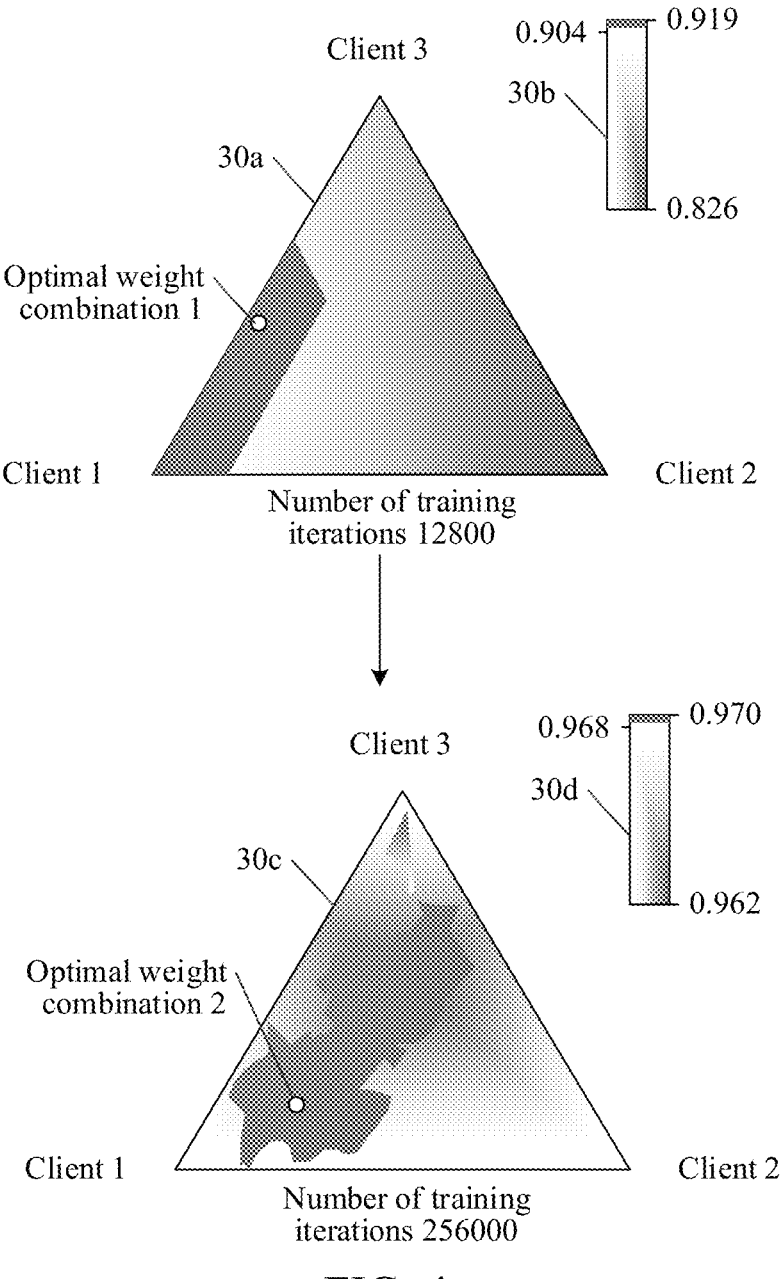
FIG. 4 is a schematic diagram of determining a target global model according to an embodiment of this disclosure.

FIG. 4 is a schematic diagram of determining a target global model according to an embodiment of this disclosure. As shown in FIG. 4, when the number of clients N is equal to 3 (multimedia sample data held by client 1, multimedia sample data held by client 2 and multimedia sample data held by client 3 need to be used in the federated training process), the determination process of the weight combination is illustrated by taking the evaluation index as the accuracy. When the local model parameter received by the service device is a local model parameter at the $12800^{th}$ training iteration, a color depth in a region 30*a* is used for representing an accuracy value of an alternative global model corresponding to the $12800^{th}$ training iteration on the multimedia verification data set, a histogram region 30*b* may be used for explaining a relationship between the color in the region 30*a* and the accuracy value, and each position in the region 30*a* may represent a weight combination.

When the local model parameter received by the service device is a local model parameter at the $256000^{th}$ training iteration, a color depth in a region 30*c* is used for representing an accuracy value of an alternative global model corresponding to the $25600^{th}$ training iteration on the multimedia verification data set, a histogram region 30*d* may be used for explaining a relationship between the color in the region 30*c* and the accuracy value, and each position in the region 30*c* may also represent a weight combination.

The regions 30*a* and 30*c* indicate that the weight combinations for the best results on the multimedia verification data set are at different positions and are dynamically changing at different training stages. As shown in FIG. 4, the optimal weight combination at the $12800^{th}$ training iteration is: an optimal weight combination 1. The optimal weight combination at the $256000^{th}$ training iteration is: an optimal weight combination 2.

Optionally, if the foregoing target global model is generated based on N local model parameters corresponding to an $r^{th}$ synchronization period (r is a positive integer), the service device may determine a target global model corresponding to the $r^{th}$ synchronization period in the alternative global model according to the evaluation index, and acquire a historical global model corresponding to an $(r-1)^{th}$ synchronization period. The historical global model is generated based on local model parameters uploaded by the N clients respectively in the $(r-1)^{th}$ synchronization period. Then training learning rates of the N local recognition models in the $r^{th}$ synchronization period may be acquired. A model parameter difference between the target global model and the historical global model is acquired. Ratios of the model parameter difference to the training learning rates are determined as federated momenta, and the federated momenta are transmitted to the N clients. The federated momenta along with the target global model are used for instructing the N clients to update parameters of the local recognition models associated therewith, and the federated momenta are used for indicating training directions of the N local recognition models in the respective clients.

For example, if the target global model corresponding to the $r^{th}$ synchronization period is represented as $\bar{\theta}_r$, the historical global model corresponding to the $(r-1)^{th}$ synchronization period is represented as $\bar{\theta}_{r-1}$, the training learning rate in the $r^{th}$ synchronization period may be represented as $\eta_r$, and the federated momentum at this moment may be represented as $$M_r^\Theta = (\bar{\theta}_r - \bar{\theta}_{r-1})/\eta_r$$

$$(M_r^\Theta)$$

may be represented as the federated momentum corresponding to the $r^{th}$ synchronization period, and $\bar{\theta}_r - \bar{\theta}_{r-1}$ may be represented as the foregoing model parameter difference). The training learning rate $\eta_r$ may be a fixed value, or may change adaptively. For example, the training learning rate may be set to 0.1 when all the multimedia sample data held by any one client is completely trained for the first time, and the training learning rate may be set to 0.02 when all the multimedia sample data held by any one client is completely trained for the $10^{th}$ time, etc. It is to be noted that the federated momentum at the $1^{st}$ synchronization period may be represented as:

$$M_1^\Theta = (\bar{\theta}_1 - 0)/\eta_r.$$

Step S105: The service device returns the target global model.

The service device may return the foregoing target global model to the N clients, and after receiving the target global model returned by the service device, any one of the clients may update parameters of the local recognition model according to the target global model, and continue training based on the updated local model parameters.

Optionally, when the service device generates a federated momentum $$M_r^\Theta,$$

the service device may return the target global model and the federated momentum $$M_r^\Theta$$

together to the N clients, and after receiving the target global model returned by the service device, any one of the clients may update parameters of the local recognition model according to the target global model and the federated momentum $$M_r^\Theta,$$

and continue training based on the updated local model parameters.

Step S106: The client receives the target global model, updates parameters of the target local recognition model according to the target global model, and determines the parameter-updated target local recognition model as an object recognition model. The object recognition model is configured to recognize objects of a target object type contained in multimedia data.

After receiving the target global model returned by the service device, the target client may update parameters of the target local recognition model thereof according to the target global model, and continue performing local training on the target local recognition model. When the number of times for training the target local recognition model reaches a training termination condition (including a training convergence condition, a maximum number of iterations, etc.), the training process on the target local recognition model is completed, and an object recognition model that completes training is obtained. The object recognition model is configured to recognize objects of a target object type contained in multimedia data.

Optionally, after receiving the global target model and the federated momentum $$M_r^\Theta$$

returned by the service device, the target client may combine the training gradient and the federated momentum $$M_r^\Theta$$

in the local training of the target client, and update parameters of the local target recognition model. For example, $$\theta_i' = \theta_i - \eta_r\left(g + \frac{M_r^\Theta}{K}\right),$$

where $\theta_i$ may be represented as the local model parameter corresponding to the local target recognition model, $$\theta_i'$$

may be represented as the local model parameter obtained by a target client i after updating in the $r^{th}$ synchronization period, g may be represented as the training gradient corresponding to the $r^{th}$ synchronization period, and K may be represented as the number of training times corresponding to one synchronization period.

Figure 5:
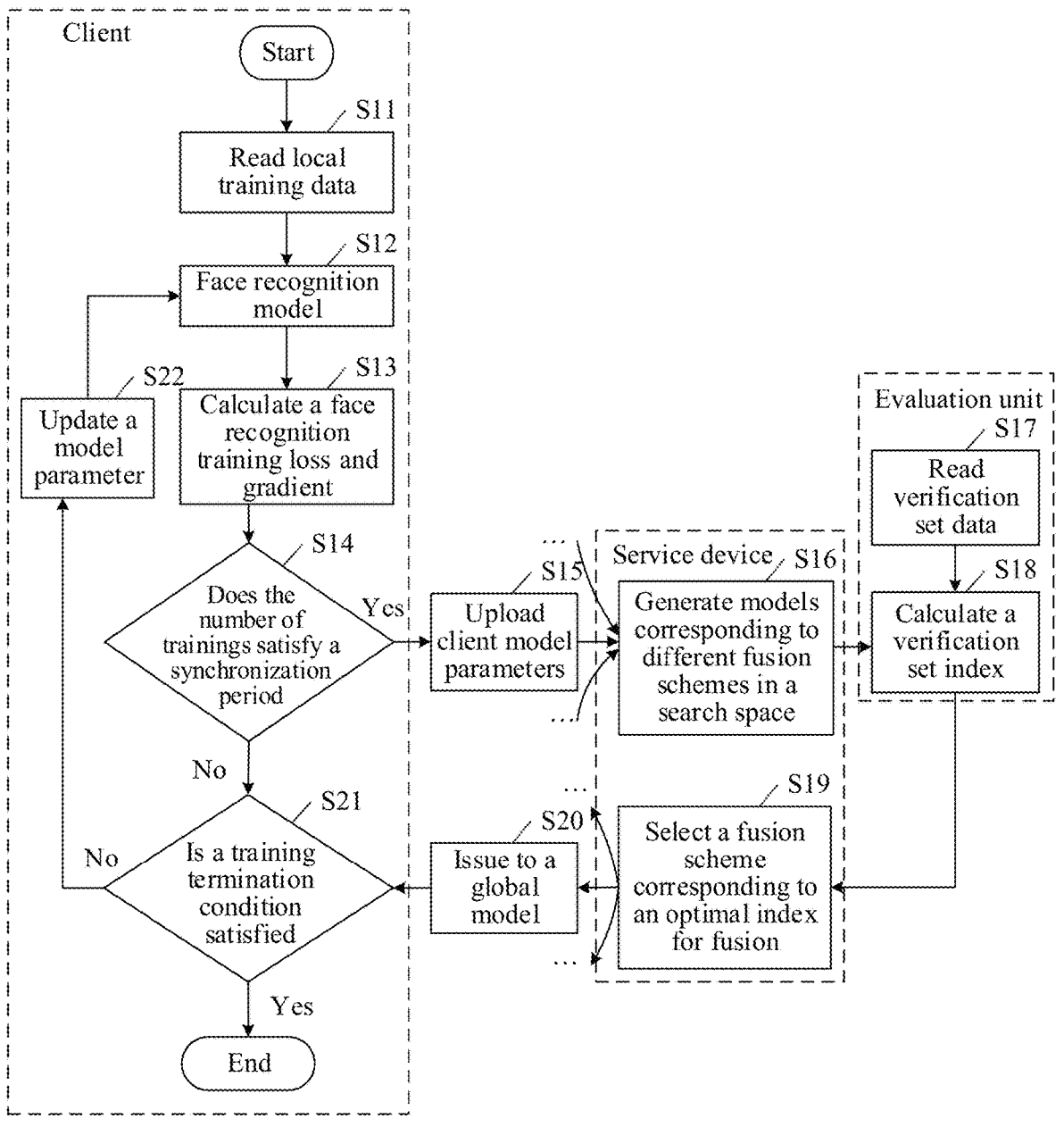
FIG. 5 is a flowchart of a federated model training method according to an embodiment of this disclosure.

FIG. 5 is a flowchart of a federated model training method according to an embodiment of this disclosure. As shown in FIG. 5, the implementation process of a federated model training method is specifically illustrated by taking multimedia sample data as a face image, and the federated model training method may be implemented by the following steps S11-S22.

In step S11, a client reads local training data, namely, may acquire face sample data (namely, the foregoing multimedia sample data) held by the client, may continue to execute step S12 to acquire an initialized face recognition model (the foregoing local recognition model), and performs local training on the face recognition model through the face sample data. That is, step S13 is executed to calculate a training loss and a training gradient of the face recognition model, and the number of times for training the face recognition model is statistically calculated in real time. The client may continue to execute step S14 to judge whether the number of training times satisfies a synchronization period (the foregoing synchronization period K). If the number of times for training the face recognition model satisfies the synchronization period, the client continues to execute step S15 to upload client model parameters (current model parameters of the face recognition model, namely, the foregoing local model parameters) to the service device. If the number of times for training the face recognition model does not satisfy the synchronization period, the client continues to execute step S21 to judge whether the face recognition model satisfies the training termination condition. If the face recognition model satisfies the training termination condition, it indicates that the training of the face recognition model is completed. If the face recognition model does not satisfy the training termination condition, the client continues to step S22 to update the local model parameters of the face recognition model.

When the number of training times corresponding to the face recognition models in the local training of all the clients (namely, the foregoing N clients) satisfy the synchronization period, the local model parameters may be uploaded to the service device, and the service device may receive the local model parameters uploaded by all the clients, and continue to execute step S16 to generate models corresponding to different fusion schemes in a search space. For example, M weight combinations are acquired, and weighted mean is performed on each weight combination and the received local model parameters respectively to obtain M alternative global models. The specific implementation process of the M weight combinations may be seen in the foregoing step S103. Then, steps S17 and S18 may be continued to be executed. The evaluation unit reads verification set data (namely, the foregoing multimedia verification data set), and acquires an evaluation index respectively corresponding to each alternative global model in the verification set (namely, calculating a verification set index). Then, steps S19 and S20 are continued to be executed.

A fusion scheme corresponding to the optimal evaluation index is selected to perform fusion so as to obtain a target global model (namely, an alternative global model corresponding to the optimal evaluation index), and the target global model is issued to each client. When the client receives the target global model and the face recognition model does not satisfy the training termination condition, step S22 is continued to be executed to update parameters of the face recognition model according to the target global model. It is to be understood that the foregoing steps S12-22 may be repeatedly executed until the face recognition model satisfies the training termination condition and the training of the face recognition model has been completed.

Figures 6, 7:
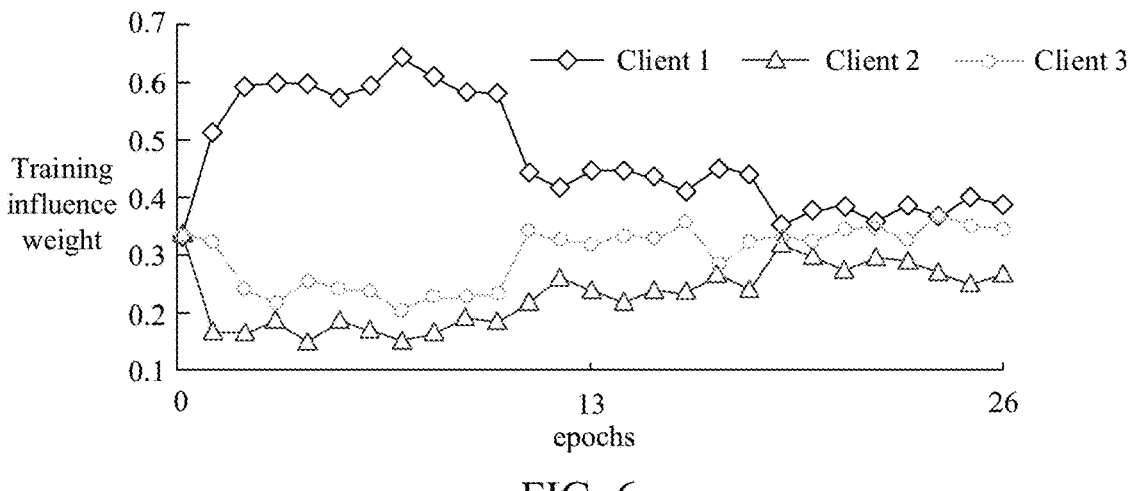
FIG. 6 is a schematic diagram of a weight combination in a multimedia verification data set according to an embodiment of this disclosure.
FIG. 7 is a schematic diagram of a user identity authentication scenario according to an embodiment of this disclosure.

FIG. 6 is a schematic diagram of a weight combination in a multimedia verification data set according to an embodiment of this disclosure. As shown in FIG. 6, when the number of clients N is equal to 3 (client 1, client 2 and client 3), the multimedia sample data used by the federated training is face data respectively held by the foregoing client 1, client 2 and client 3. In the process of performing local training based on the face data held by the foregoing three clients, it is assumed that epochs=26 in the federated training, where epoch is used for representing the number of complete trainings on the face data held by each client. The abscissa in the graph shown in FIG. 6 is epochs, and the ordinate may be the corresponding training influence weight at different epochs. Obviously, with the increase of epochs, the training influence weights corresponding to the local model parameters trained by the three clients are more concentrated. That is to say, the training influence weights corresponding to each client are closer to each other at a later training stage.

Optionally, for an object recognition model trained locally by each client, when multimedia data includes a face image and a target object type includes a face type, the target client may acquire the face image, input the face image to the object recognition model, and output face space features corresponding to the face image through the object recognition model. Then a face classification result corresponding to the face image may be determined according to the face space features. The face classification result is used for representing an identity authentication result of an object of a face type contained in the face image.

In other words, the object recognition model may be used for any scenario where face recognition is performed, such as a user identity authentication scenario, a missing population pursuit scenario, or a service handling scenario. Illustratively, in the user identity authentication scenario and the service handling scenario, an object recognition model may be used to recognize a user face image provided by a user in the identity authentication scenario so as to confirm the identity authenticity of the user face image. In the missing population pursuit scenario, photos of the missing population before missing may be recognized and compared with the existing household registration photos to acquire suspected users of the missing population.

FIG. 7 is a schematic diagram of a user identity authentication scenario according to an embodiment of this disclosure. As shown in FIG. 7, when user A wants to handle a service in client 1 installed by a user terminal 40a, user A is required to perform identity authentication in client 1. When user A initiates an identity authentication request in client 1 installed by the user terminal 40a, a face verification box 40b may be displayed in client 1. User A may align a face with the face verification box 40b in the user terminal 40a, and perform a corresponding action (for example, shaking, nodding, blinking, etc.) following the instruction. The user terminal 40a may collect a face image 40c in the face verification box 40b in real time, and input the face image 40c collected in real time to an object recognition model 40d. Feature extraction is performed on the face image 40c in the object recognition model 40d, and a face recognition result corresponding to the face image 40c is acquired. At the same time, client 1 may acquire a certificate image 40e uploaded by user A in advance from an existing face image database, and compare the certificate image 40e with a face recognition result output by the object recognition model 40d. If the certificate image 40e is the same as the face recognition result, it may be determined that user A passes the identity authentication, and an identity authentication pass result is returned to client 1 of the user terminal 40a. If the certificate image 40e is different from the face recognition result, it may be determined that user A does not pass the identity authentication, and an identity authentication failure result is returned to client 1 of the user terminal 40a, so as to remind user A to perform identity authentication again.

In the embodiments of this disclosure, local model parameters of a local recognition model, which are respectively uploaded by N clients, may be acquired, and M parameter fusion modes (such as M weight combinations) (M is a positive integer) for a local model parameter set determined based on the N local model parameters may be acquired. Parameter fusion is performed on the local model parameter set respectively through each parameter fusion mode (such as each weight combination), so as to obtain M alternative global models. Then, an optimal target global model is selected from the M alternative global models through evaluation indexes of the M alternative global models respectively in a multimedia verification data set. That is, an optimal target global model is selected from the M alternative global models obtained according to the M parameter fusion modes, whereby the fusion efficiency of the N local model parameters can be improved. The N clients continuously update parameters of the respective local recognition models based on the target global model, whereby the generalization effect of the object recognition model can be improved. The embodiments of this disclosure may be applied to cross-department, cross-enterprise and even cross-region service data, thereby improving the recognition effect of the object recognition model while ensuring data privacy and security.

Figure 8:
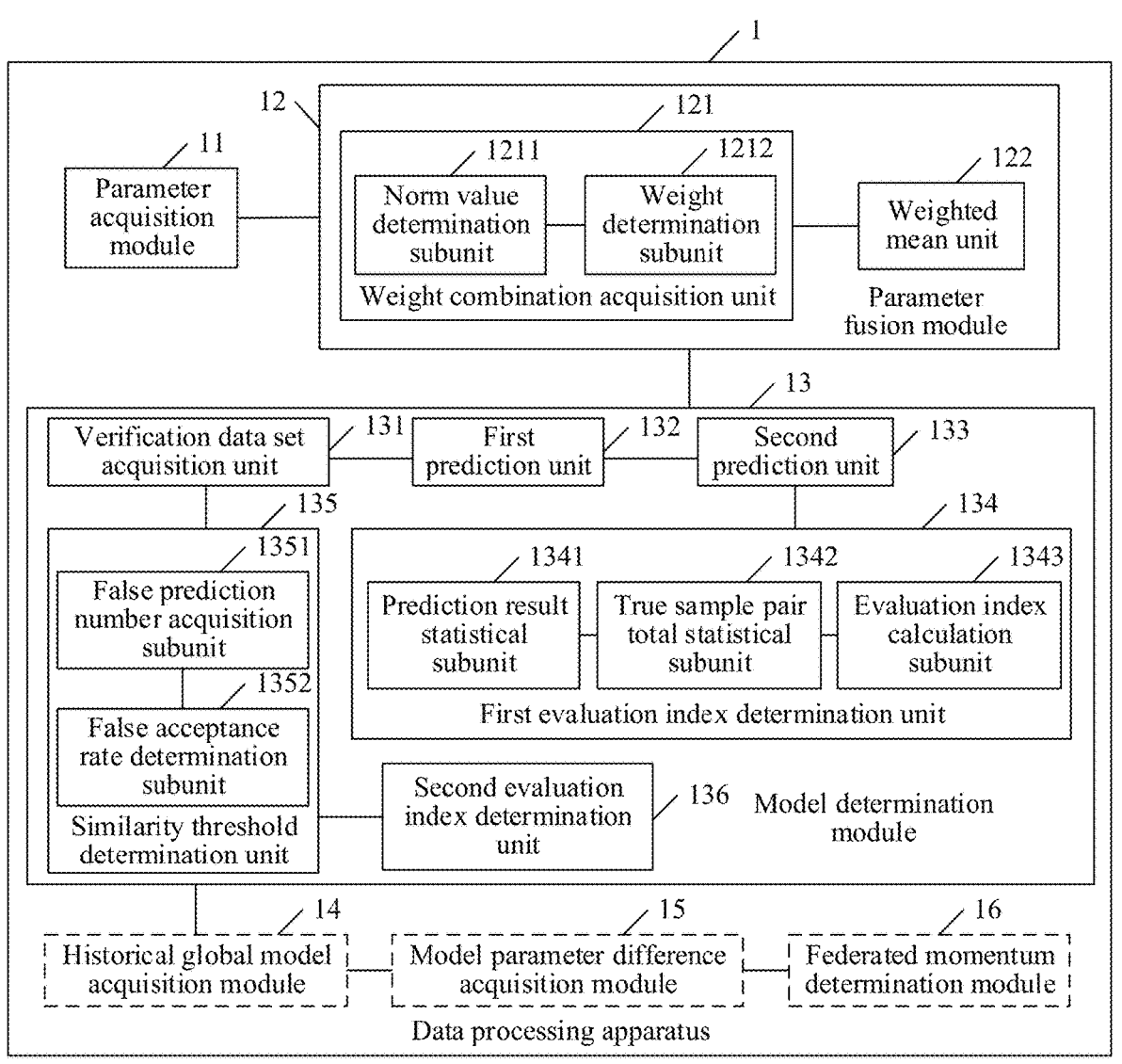
FIG. 8 is a schematic structural diagram of a data processing apparatus according to an embodiment of this disclosure.

FIG. 8 is a schematic structural diagram of a data processing apparatus according to an embodiment of this disclosure. As shown in FIG. 8, the data processing apparatus may be a service device (for example, a server 10d) applied to the embodiment corresponding to FIG. 1. The data processing apparatus 1 may include: a parameter acquisition module 11, a parameter fusion module 12, and a model determination module 13.

Herein, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The parameter acquisition module 11 is configured to acquire local model parameters respectively corresponding to N local recognition models. The N local recognition models are obtained respectively by N clients performing independent training. Each client includes multimedia sample data for training the associated local recognition model. The multimedia sample data contains objects of a target object type. N is a positive integer greater than 1.

The parameter fusion module 12 is configured to acquire M parameter fusion modes associated with a local model parameter set, and perform parameter fusion on the local model parameter set respectively according to each parameter fusion mode, so as to obtain M alternative global models. The local model parameter set is determined based on local model parameters respectively corresponding to the N local recognition models. M is a positive integer.

The model determination module 13 is configured to acquire evaluation indexes of the M alternative global models respectively in a multimedia verification data set, determine a target global model in the M alternative global models according to the evaluation indexes, and transmit the target global model to the N clients, whereby the N clients update parameters of a local recognition model associated therewith according to the target global model respectively, so as to obtain an object recognition model. The object recognition model is configured to recognize objects of a target object type contained in multimedia data.

For specific functional implementations of the parameter acquisition module 11, the parameter fusion module 12, and the model determination module 13, reference may be made to steps S102-S105 in the embodiment corresponding to FIG. 3.

In some feasible implementations, a parameter fusion mode is implemented based on a weight combination. The parameter fusion module 12 is configured to acquire M weight combinations associated with the local model parameter set, and perform parameter fusion on the local model parameter set respectively according to each weight combination, so as to obtain the M alternative global models. Each weight combination includes a training influence weight respectively corresponding to each local model parameter in the local model parameter set.

In some feasible implementations, the parameter fusion module 12 may include: a weight combination acquisition unit 121 and a weighted mean unit 122.

The weight combination acquisition unit 121 is configured to acquire M weight combinations associated with the local model parameter set. The M weight combinations include a weight combination i, and i is a positive integer less than or equal to M.

The weighted mean unit 122 is configured to perform weighted mean on a training influence weight contained in the weight combination i and each local model parameter contained in the local model parameter set to obtain a fused model parameter, and determine a recognition model carrying the fused model parameter as an alternative global model i associated with the weight combination i.

In some feasible implementations, the model determination module 13 is specifically configured to: determine, from the M alternative global models, an alternative global model corresponding to the largest evaluation index as the target global model.

For specific functional implementations of the weight combination acquisition unit 121 and the weighted mean unit 122, reference may be made to step S103 in the embodiment corresponding to FIG. 3.

In some feasible implementations, the local model parameter set includes local model parameters respectively corresponding to the N local recognition models. The weight combination acquisition unit 121 may include: a norm value determination subunit 1211 and a weight determination subunit 1212.

The norm value determination subunit 1211 is configured to sample N values within a target value range, and determine the sum of absolute values corresponding to the N values as a norm value.

The weight determination subunit 1212 is configured to determine a ratio of each of the N values to the norm value as a weight combination i associated with the local model parameter set.

For specific functional implementations of the norm value determination subunit 1211 and the weight determination subunit 1212, reference may be made to step S103 in the embodiment corresponding to FIG. 3.

In some feasible implementations, the model determination module 13 may include: a verification data set acquisition unit 131, a first prediction unit 132, a second prediction unit 133, and a first evaluation index determination unit 134.

The verification data set acquisition unit 131 is configured to acquire a multimedia verification data set containing positive sample pairs and negative sample pairs. The positive sample pairs refer to multimedia sample data pairs containing the same object, and the negative sample pairs refer to multimedia sample data pairs containing different objects.

The first prediction unit 132 is configured to input the positive sample pairs to an alternative global model i in the M alternative global models, and output first object prediction results of the positive sample pairs through the alternative global model i. i is a positive integer less than or equal to M.

The second prediction unit 133 is configured to input the negative sample pairs to the alternative global model i, and output second object prediction results of the negative sample pairs through the alternative global model i.

The first evaluation index determination unit 134 is configured to determine an evaluation index of the alternative global model i in the multimedia verification data set according to the first object prediction results and the second object prediction results.

In some feasible implementations, the first evaluation index determination unit 134 may include: a prediction result statistical subunit 1341, a true sample pair total statistical subunit 1342, and an evaluation index calculation subunit 1343.

The prediction result statistical subunit 1341 is configured to: statistically calculate a first number of true predictions of the alternative global model i in the positive sample pairs according to the first object prediction results; and statistically calculate a second number of true predictions of the alternative global model i in the negative sample pairs according to the second object prediction results.

The true sample pair total statistical subunit 1342 is configured to determine the sum of the first number of true predictions and the second number of true predictions as a total number of predicted true sample pairs of the alternative global model i in the multimedia verification data set.

The evaluation index calculation subunit 1343 is configured to acquire a total number of sample pairs corresponding to the multimedia verification data set, and determine an evaluation index of the alternative global model i in the multimedia verification data set according to a ratio of the total number of predicted true sample pairs to the total number of sample pairs.

In some feasible implementations, there are P multimedia verification data sets. The P multimedia verification data sets include a multimedia verification data set j. P is a positive integer, and j is a positive integer less than or equal to P.

The evaluation index calculation subunit 1343 is specifically configured to: determine a ratio of a total number of predicted true sample pairs of the alternative global model i in the multimedia verification data set j to a total number of sample pairs corresponding to the multimedia verification data set j as a prediction accuracy of the alternative global model i in the multimedia verification data set j; acquire prediction accuracies of the alternative global model i respectively in the P multimedia verification data sets, and statistically calculate a mean accuracy corresponding to the P prediction accuracies and a standard difference corresponding to the P prediction accuracies; and determine an evaluation index of the alternative global model i in the P multimedia verification data sets according to the mean accuracy and the standard difference.

For specific functional implementations of the verification data set acquisition unit 131, the first prediction unit 132, the second prediction unit 133, and the first evaluation index determination unit 134, reference may be made to step S104 in the embodiment corresponding to FIG. 3.

In some feasible implementations, the model determination module 13 may include: a verification data set acquisition unit 131, a similarity threshold determination unit 135, and a second evaluation index determination unit 136.

The verification data set acquisition unit 131 is configured to acquire a multimedia verification data set containing positive sample pairs and negative sample pairs. The positive sample pairs refer to multimedia sample data pairs containing the same object, and the negative sample pairs refer to multimedia sample data pairs containing different objects.

The similarity threshold determination unit 135 is configured to acquire a false acceptance rate of an alternative global model i contained in the M alternative global models in the multimedia verification data set, and determine a similarity threshold in a similarity corresponding to the negative sample pairs. The similarity threshold is determined by the number of the negative sample pairs and the false acceptance rate, and i is a positive integer less than or equal to M.

The second evaluation index determination unit 136 is configured to acquire a similarity corresponding to the positive sample pairs, acquire first sample pairs having a similarity greater than the similarity threshold in the positive sample pairs, and determine a ratio of the number of the first sample pairs to the number of the positive sample pairs as an evaluation index of the alternative global model i in the multimedia verification data set.

In some feasible implementations, the similarity threshold determination unit 135 may include: a false prediction number acquisition subunit 1351 and a false acceptance rate determination subunit 1352.

The false prediction number acquisition subunit 1351 is configured to acquire a number of false predictions of an alternative global model i contained in the M alternative global models in the negative sample pairs.

The false acceptance rate determination subunit 1352 is configured to determine a ratio of the number of false predictions to the number of the negative sample pairs as a false acceptance rate of the alternative global model i in the multimedia verification data set.

For specific functional implementations of the verification data set acquisition unit 131, the similarity threshold determination unit 135, and the second evaluation index determination unit 136, reference may be made to step S104 in the embodiment corresponding to FIG. 3. Illustratively, when the first prediction unit 132, the second prediction unit 133, and the first evaluation index determination unit 134 execute corresponding steps, the similarity threshold determination unit 135 and the second evaluation index determination unit 136 both suspend executing operations. When the similarity threshold determination unit 135 and the second evaluation index determination unit 136 executes corresponding operations, the first prediction unit 132, the second prediction unit 133, and the first evaluation index determination unit 134 all suspend executing corresponding operations.

In some feasible implementations, the target global model is generated based on N local model parameters corresponding to an $r^{th}$ synchronization period, and r is a positive integer.

The data processing apparatus 1 may further include: a historical global model acquisition module 14, a model parameter difference acquisition module 15, and a federated momentum determination module 16.

The historical global model acquisition module 14 is configured to acquire a historical global model corresponding to an $(r-1)^{th}$ synchronization period. The historical global model is generated based on local model parameters uploaded by the N clients respectively in the $(r-1)^{th}$ synchronization period.

The model parameter difference acquisition module 15 is configured to: acquire training learning rates of the N local recognition models in the $r^{th}$ synchronization period; and acquire a model parameter difference between the target global model and the historical global model.

The federated momentum determination module 16 is configured to determine ratios of the model parameter difference to the training learning rates as federated momenta, and transmit the federated momenta to the N clients. The federated momenta along with the target global model are used for instructing the N clients to update parameters of the local recognition models associated therewith, and the federated momenta are used for indicating training directions of the N local recognition models in the respective clients.

For specific functional implementations of the historical global model acquisition module 14, the model parameter difference acquisition module 15, and the federated momentum determination module 16, reference may be made to step S104 in the embodiment corresponding to FIG. 3.

In the embodiments of this disclosure, local model parameters of a local recognition model, which are respectively uploaded by N clients, may be acquired, and M parameter fusion modes (such as M weight combinations) (M is a positive integer) for a local model parameter set determined based on the N local model parameters may be acquired. Parameter fusion is performed on the local model parameter set respectively through each parameter fusion mode (such as each weight combination), so as to obtain M alternative global models. Then, an optimal target global model is selected from the M alternative global models through evaluation indexes of the M alternative global models respectively in a multimedia verification data set. That is, an optimal target global model is selected from the M alternative global models obtained according to the M parameter fusion modes, whereby the fusion efficiency of the N local model parameters can be improved. The N clients continuously update parameters of the respective local recognition models based on the target global model, whereby the generalization effect of the object recognition model can be improved. The embodiments of this disclosure may be applied to cross-department, cross-enterprise and even cross-region service data, thereby improving the recognition effect of the object recognition model while ensuring data privacy and security.

Figure 9:
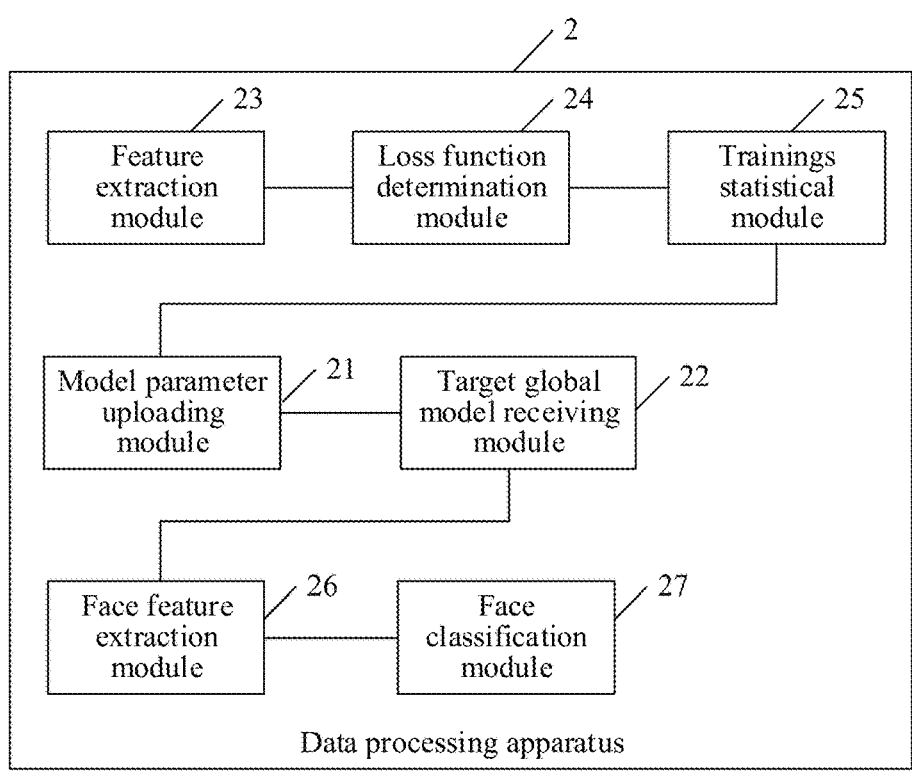
FIG. 9 is a schematic structural diagram of a data processing apparatus according to an embodiment of this disclosure.

FIG. 9 is a schematic structural diagram of a data processing apparatus according to an embodiment of this disclosure. As shown in FIG. 9, the data processing apparatus may be a client applied to any one user terminal in the user terminal cluster shown in FIG. 1. The client may be a computer program (including program code) in a computer device. The data processing apparatus 2 may include: a model parameter uploading module 21 and a target global model receiving module 22.

The model parameter uploading module 21 is configured to upload, in response to the number of times for training a target local recognition model satisfying a synchronization period, local model parameters corresponding to the target local recognition model to a service device, whereby the service device obtains a target global model based on the local model parameters respectively uploaded by N clients. The local model parameters respectively uploaded by the N clients include the local model parameters corresponding to the target local recognition model. The target global model is determined by evaluation indexes of M alternative global models respectively in a multimedia verification data set. The M alternative global models are determined by M parameter fusion modes associated with a local model parameter set and the local model parameter set. The local model parameter set is determined based on the local model parameters respectively uploaded by the N clients. N is a positive integer greater than 1, and M is a positive integer.

The target global model receiving module 22 is configured to receive the target global model returned by the service device, update parameters of the target local recognition model according to the target global model, and determine the parameter-updated target local recognition model as an object recognition model. The object recognition model is configured to recognize objects of a target object type contained in multimedia data.

For specific functional implementations of the model parameter uploading module 21 and the target global model receiving module 22, reference may be made to steps S101 and S105-S106 in the embodiment corresponding to FIG. 3.

In some feasible implementations, the data processing apparatus 2 may further include: a feature extraction module 23, a loss function determination module 24, and a trainings statistical module 25.

The feature extraction module 23 is configured to acquire multimedia sample data, input the multimedia sample data into the target local recognition model, and output an object space feature corresponding to the multimedia sample data through the target local recognition model.

The loss function determination module 24 is configured to determine a training loss function corresponding to the target local recognition model according to tag information corresponding to the object space feature and the multimedia sample data.

The trainings statistical module 25 is configured to determine a training gradient of the target local recognition model according to the training loss function, update parameters of the target local recognition model according to the training gradient and a training learning rate corresponding to the target local recognition model, and statistically calculate the number of trainings corresponding to the target local recognition model.

For specific functional implementations of the feature extraction module 23, the loss function determination module 24, and the trainings statistical module 25, reference may be made to step S101 in the embodiment corresponding to FIG. 3.

In some feasible implementations, the multimedia data includes a face image, and the target object type includes a face type.

The data processing apparatus 2 may further include: a face feature extraction module 26 and a face classification module 27.

The face feature extraction module 26 is configured to acquire the face image, input the face image to the object recognition model, and output face space features corresponding to the face image through the object recognition model.

The face classification module 27 is configured to determine a face classification result corresponding to the face image according to the face space features. The face classification result is used for representing an identity authentication result of an object of a face type contained in the face image.

For specific functional implementations of the face feature extraction module 26 and the face classification module 27, reference may be made to step S106 in the embodiment corresponding to FIG. 3.

In the embodiments of this disclosure, local model parameters of a local recognition model, which are respectively uploaded by N clients, may be acquired, and M parameter fusion modes (such as M weight combinations) (M is a positive integer) for a local model parameter set determined based on the N local model parameters may be acquired. Parameter fusion is performed on the local model parameter set respectively through each parameter fusion mode (such as each weight combination), so as to obtain M alternative global models. Then, an optimal target global model is selected from the M alternative global models through evaluation indexes of the M alternative global models respectively in a multimedia verification data set. That is, an optimal target global model is selected from the M alternative global models obtained according to the M parameter fusion modes, whereby the fusion efficiency of the N local model parameters can be improved. The N clients continuously update parameters of the respective local recognition models based on the target global model, whereby the generalization effect of the object recognition model can be improved. The embodiments of this disclosure may be applied to cross-department, cross-enterprise and even cross-region service data, thereby improving the recognition effect of the object recognition model while ensuring data privacy and security.

Figure 10:
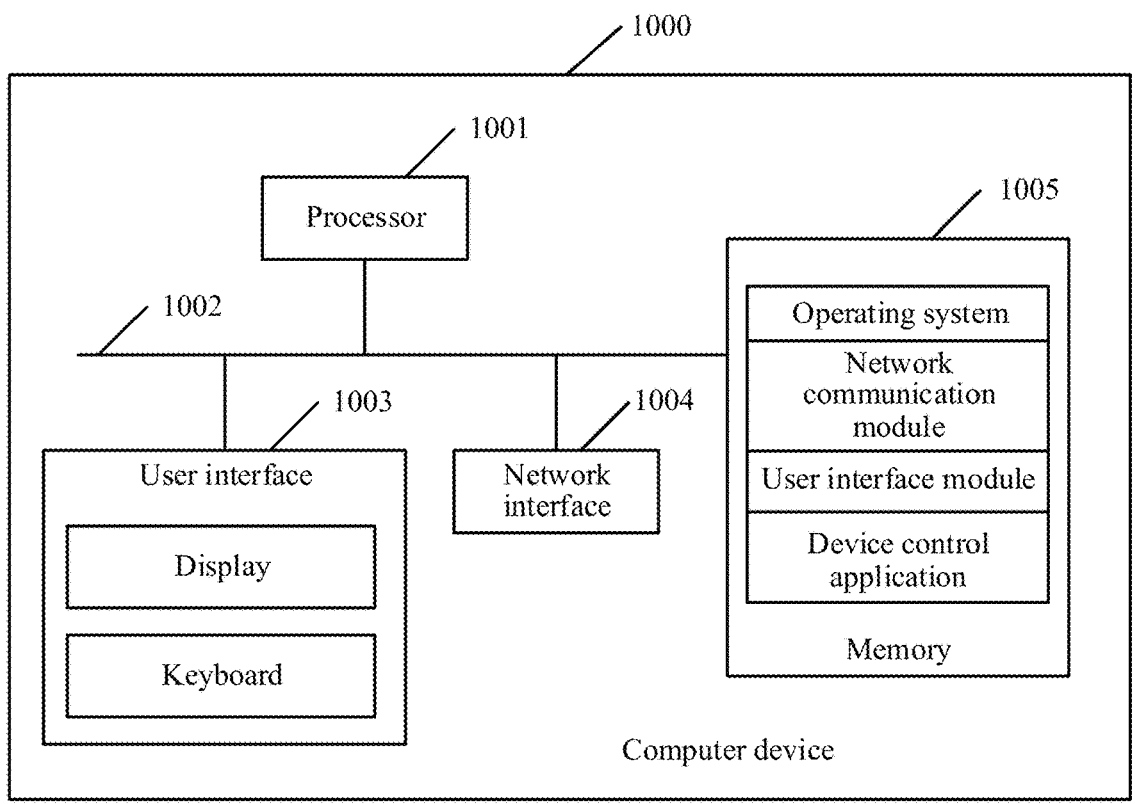
FIG. 10 is a schematic structural diagram of a computer device according to an embodiment of this disclosure.

FIG. 10 is a schematic structural diagram of a computer device according to an embodiment of this disclosure. As shown in FIG. 10, the computer device 1000 may include: a processor 1001, a network interface 1004, and a memory 1005. In addition, the computer device 1000 may further include: a user interface 1003 and at least one communication bus 1002. The communication bus 1002 is configured to implement connection and communication between the components. The user interface 1003 may include a display and a keyboard. Optionally, the user interface 1003 may further include a standard wired interface and wireless interface. Optionally, the network interface 1004 may include a standard wired interface and wireless interface (such as a WI-FI interface). The memory 1005 may be a high-speed RAM, or a non-volatile memory, for example, at least one disk memory. Optionally, the memory 1005 may further be at least one storage apparatus that is located far away from the foregoing processor 1001. As shown in FIG. 10, the memory 1005 used as a computer-readable storage medium may include an operating system, a network communication module, a user interface module, and a device control application program.

In the computer device 1000 as shown in FIG. 10, the network interface 1004 may provide a network communication function. The user interface 1003 is mainly used as an interface enabling input by a user, and the processor 1001 may be configured to call a device control application program stored in the memory 1005 to:

acquire local model parameters respectively corresponding to N local recognition models, the N local recognition models being obtained respectively by N clients performing independent training, each client including multimedia sample data for training the associated local recognition model, the multimedia sample data containing objects of a target object type, and N being a positive integer greater than 1;

acquire M parameter fusion modes associated with a local model parameter set, and perform parameter fusion on the local model parameter set respectively according to each parameter fusion mode, so as to obtain M alternative global models, the local model parameter set being determined based on local model parameters respectively corresponding to the N local recognition models, and M being a positive integer; and acquire evaluation indexes of the M alternative global models respectively in a multimedia verification data set, determine a target global model in the M alternative global models according to the evaluation indexes, and transmit the target global model to N clients, whereby the N clients update parameters of a local recognition model associated therewith according to the target global model respectively, so as to obtain an object recognition model, the object recognition model being configured to recognize objects of a target object type contained in multimedia data.

It is to be understood that the computer device 1000 as described in the embodiments of this disclosure may perform the description of the data processing method in the embodiment corresponding to FIG. 3, as well as the description of the data processing apparatus 1 in the embodiment corresponding to FIG. 8. In addition, the description of beneficial effects of the same method are not described herein again.

Figure 11:
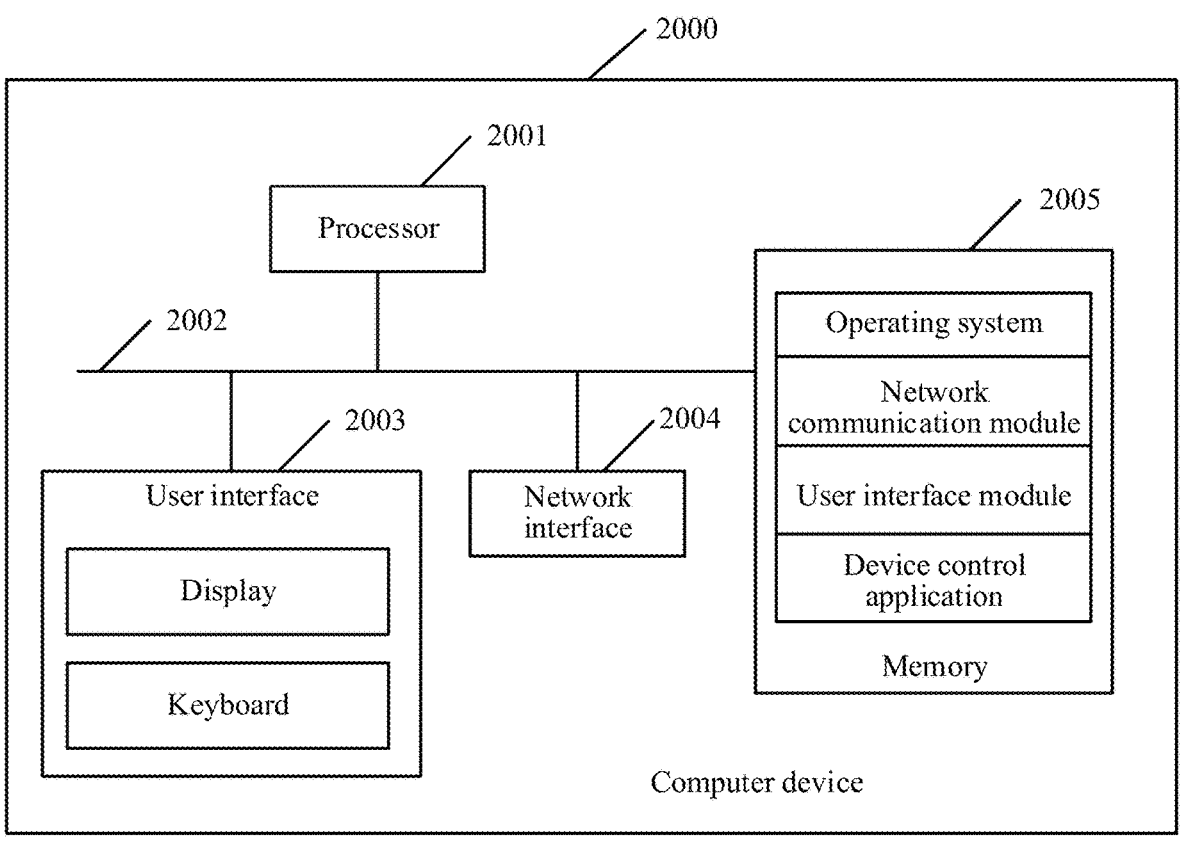
FIG. 11 is a schematic structural diagram of a computer device according to an embodiment of this disclosure.

FIG. 11 is a schematic structural diagram of a computer device according to an embodiment of this disclosure. As shown in FIG. 11, the computer device 2000 may include: a processor 2001, a network interface 2004, and a memory 2005. In addition, the computer device 2000 may further include: a user interface 2003 and at least one communication bus 2002. The communication bus 2002 is configured to implement connection and communication between the components. The user interface 2003 may include a display and a keyboard. Optionally, the user interface 2003 may further include a standard wired interface and wireless interface. Optionally, the network interface 2004 may include a standard wired interface and wireless interface (such as a WI-FI interface). The memory 2005 may be a high-speed RAM, or a non-volatile memory, for example, at least one disk memory. Optionally, the memory 2005 may further be at least one storage apparatus that is located far away from the foregoing processor 2001. As shown in FIG. 11, the memory 2005 used as a computer-readable storage medium may include an operating system, a network communication module, a user interface module, and a device control application program.

In the computer device 2000 as shown in FIG. 11, the network interface 2004 may provide a network communication function. The user interface 2003 is mainly used as an interface enabling input by a user, and the processor 2001 may be configured to call a device control application program stored in the memory 2005 to:

upload, in response to the number of times for training a target local recognition model satisfying a synchronization period, local model parameters corresponding to the target local recognition model to a service device, whereby the service device obtains a target global model based on the local model parameters respectively uploaded by N clients, the local model parameters respectively uploaded by the N clients including the local model parameters corresponding to the target local recognition model, the target global model being determined by evaluation indexes of M alternative global models respectively in a multimedia verification data set, the M alternative global models being determined by M parameter fusion modes associated with a local model parameter set and the local model parameter set, the local model parameter set being determined based on the local model parameters respectively uploaded by the N clients, N being a positive integer greater than 1, and M being a positive integer; and receive the target global model returned by the service device, update parameters of the target local recognition model according to the target global model, and determine the parameter-updated target local recognition model as an object recognition model, the object recognition model being configured to recognize objects of a target object type contained in multimedia data.

It is to be understood that the computer device 2000 as described in the embodiments of this disclosure may perform the description of the data processing method in the embodiment corresponding to FIG. 3, as well as the description of the data processing apparatus 2 in the embodiment corresponding to FIG. 9.

Furthermore, it is to be noted that: embodiments of this disclosure also provide a non-transitory computer-readable storage medium. The computer program executed by the aforementioned data processing apparatus 1 and the computer program executed by the data processing apparatus 2 are stored in the non-transitory computer-readable storage medium. The computer program includes program instructions. When executed by a processor, the program instructions are capable of executing the description of the data processing method in the embodiment corresponding to FIG. 3. For technical details that are not disclosed in the embodiments of the non-transitory computer-readable storage medium involved in this disclosure, reference is made to the descriptions of the method embodiments of this disclosure. By way of example, program instructions may be deployed to be executed on one computing device, or on a plurality of computing devices located at one site, or on a plurality of computing devices distributed across a plurality of sites and interconnected by a communication network. The plurality of computing devices distributed across the plurality of sites and interconnected by the communication network may form a block chain system.

Furthermore, it is to be noted that: embodiments of this disclosure also provide a computer program product or computer program. The computer program product or computer program may include computer instructions. The computer instructions may be stored in a computer-readable storage medium. A processor of a computer device reads the computer instructions from the computer-readable storage medium. The processor may execute the computer instructions, so as to enable the computer device to perform the description of the data processing method in the embodiment corresponding to FIG. 3. For technical details that are not disclosed in the embodiments of the computer program product or computer program involved in this disclosure, reference is made to the descriptions of the method embodiments of this disclosure.

It is to be noted that to simplify the description, the foregoing method embodiments are described as a series of action combination. But a person of ordinary skill in the art may know that this disclosure is not limited to any described sequence of the action, as some steps may adopt other sequences or may be executed simultaneously according to this disclosure. Secondarily, a person skilled in the art may know that the embodiments described in the specification all belong to optional embodiments and the actions and modules are not necessary for this disclosure. The steps in the method of the embodiments of this disclosure may be sequentially adjusted, combined and deleted according to actual needs. The modules in the apparatus of the embodiments of this disclosure may be combined, divided and deleted according to actual needs.

A person of ordinary skill in the art may understand that all or a part of the processes of the method in the foregoing embodiment may be implemented by a computer program instructing relevant hardware. The computer program may be stored in a computer-readable storage medium. When the program is executed, the processes of the method in the foregoing embodiment may be included. The storage medium may be a magnetic disc, an optical disc, a read-only memory (ROM), or a random access memory (RAM), etc.

What is disclosed above is merely alternative embodiments of this disclosure, and certainly is not intended to limit the scope of the claims of this disclosure. Therefore, equivalent variations made in accordance with the claims of this disclosure fall within the scope of this disclosure.

What is claimed is:

1. A data processing method, performed by a service device, the method comprising:

acquiring local model parameters respectively corresponding to N local recognition models, the N local recognition models being obtained respectively by N clients performing independent training, each of the N clients comprising multimedia sample data for training the local recognition model, the multimedia sample data containing objects of a target object type, and N being a positive integer greater than 1;

acquiring M parameter fusion modes associated with a local model parameter set, and performing parameter fusion on the local model parameter set respectively according to each of the M parameter fusion modes, so as to obtain M alternative global models, the local model parameter set being determined based on the local model parameters respectively corresponding to the N local recognition models, and M being a positive integer greater than 1;

acquiring evaluation indexes of the M alternative global models respectively in a multimedia verification data set;

determining a target global model in the M alternative global models according to the evaluation indexes; and transmitting the target global model to the N clients, whereby the N clients update parameters of a local recognition model associated with the target global model according to the target global model respectively, so as to obtain an object recognition model, the object recognition model being configured to recognize objects of a target object type contained in multimedia data.

2. The method according to claim 1, wherein a parameter fusion mode is implemented based on a weight combination, and the acquiring the M parameter fusion modes associated with the local model parameter set and performing the parameter fusion on the local model parameter set respectively so as to obtain the M alternative global models comprises:

acquiring M weight combinations associated with the local model parameter set; and performing the parameter fusion on the local model parameter set respectively according to each of the M weight combinations, so as to obtain the M alternative global models, each of the M weight combinations comprising a training influence weight respectively corresponding to each of local model parameters in the local model parameter set.

3. The method according to claim 2, wherein the M weight combinations comprise a weight combination i, i being a positive integer less than or equal to M, the performing the parameter fusion on the local model parameter set respectively so as to obtain the M alternative global models comprises:

performing weighted mean on a training influence weight contained in the weight combination i and the local model parameters contained in the local model parameter set to obtain a fused model parameter; and determining a recognition model carrying the fused model parameter as an alternative global model i associated with the weight combination i.

4. The method according to claim 2, wherein the determining the target global model in the M alternative global models according to the evaluation indexes comprises:

determining, from the M alternative global models, an alternative global model corresponding to a largest evaluation index as the target global model.

5. The method according to claim 3, wherein the local model parameter set comprises local model parameters respectively corresponding to the N local recognition models, and the acquiring the M weight combinations associated with the local model parameter set comprises:

sampling N values within a target value range, and determining a sum of absolute values corresponding to the N values as a norm value; and determining a ratio of each of the N values to the norm value as a weight combination i associated with the local model parameter set.

6. The method according to claim 1, wherein the acquiring the evaluation indexes of the M alternative global models respectively in the multimedia verification data set comprises:

acquiring the multimedia verification data set containing positive sample pairs and negative sample pairs, the positive sample pairs referring to multimedia sample data pairs containing the same object, and the negative sample pairs referring to multimedia sample data pairs containing different objects;

inputting the positive sample pairs to an alternative global model i in the M alternative global models, and outputting first object prediction results of the positive sample pairs through the alternative global model i, i being a positive integer less than or equal to M;

inputting the negative sample pairs to the alternative global model i, and outputting second object prediction results of the negative sample pairs through the alternative global model i; and determining an evaluation index of the alternative global model i in the multimedia verification data set according to the first object prediction results and the second object prediction results.

7. The method according to claim 6, wherein the determining the evaluation index of the alternative global model i in the multimedia verification data set according to the first object prediction results and the second object prediction results comprises:

statistically calculating a first number of true predictions of the alternative global model i in the positive sample pairs according to the first object prediction results;

statistically calculating a second number of true predictions of the alternative global model i in the negative sample pairs according to the second object prediction results;

determining a sum of the first number of true predictions and the second number of true predictions as a total number of predicted true sample pairs of the alternative global model i in the multimedia verification data set;

acquiring a total number of sample pairs corresponding to the multimedia verification data set; and determining the evaluation index of the alternative global model i in the multimedia verification data set according to a ratio of the total number of predicted true sample pairs to the total number of sample pairs.

8. The method according to claim 7, wherein there are P multimedia verification data sets, and the P multimedia verification data sets comprise a multimedia verification data set j, P being a positive integer, and j being a positive integer less than or equal to P, and the determining the evaluation index of the alternative global model i in the multimedia verification data set according to a ratio of the total number of predicted true sample pairs to the total number of sample pairs comprises:

determining a ratio of the total number of predicted true sample pairs of the alternative global model i in the multimedia verification data set j to the total number of sample pairs corresponding to the multimedia verification data set j as a prediction accuracy of the alternative global model i in the multimedia verification data set j;

acquiring prediction accuracies of the alternative global model i respectively in the P multimedia verification data sets, and statistically calculating a mean accuracy corresponding to the P prediction accuracies and a standard difference corresponding to the P prediction accuracies; and determining the evaluation index of the alternative global model i in the P multimedia verification data sets according to the mean accuracy and the standard difference.

9. The method according to claim 1, wherein the acquiring the evaluation indexes of the M alternative global models respectively in the multimedia verification data set comprises:

acquiring the multimedia verification data set containing positive sample pairs and negative sample pairs, the positive sample pairs referring to multimedia sample data pairs containing the same object, and the negative sample pairs referring to multimedia sample data pairs containing different objects;

acquiring a false acceptance rate of an alternative global model i contained in the M alternative global models in the multimedia verification data set, and determining a similarity threshold in a similarity corresponding to the negative sample pairs, the similarity threshold being determined by a number of the negative sample pairs and the false acceptance rate, and i being a positive integer less than or equal to M; and acquiring a similarity corresponding to the positive sample pairs, and acquiring first sample pairs having a similarity greater than the similarity threshold in the positive sample pairs, and determining a ratio of the number of the first sample pairs to the number of the positive sample pairs as the evaluation index of the alternative global model i in the multimedia verification data set.

10. The method according to claim 9, wherein the acquiring the false acceptance rate of the alternative global model i contained in the M alternative global models in the multimedia verification data set comprises:

acquiring a number of false predictions of an alternative global model i contained in the M alternative global models in the negative sample pairs, and determining a ratio of the number of false predictions to the number of the negative sample pairs as the false acceptance rate of the alternative global model i in the multimedia verification data set.

11. The method according to claim 1, wherein the target global model is generated based on N local model parameters corresponding to an $r^{th}$ synchronization period, r being a positive integer, and the method further comprises:

acquiring a historical global model corresponding to an $(r-1)^{th}$ synchronization period, the historical global model being generated based on local model parameters uploaded by the N clients respectively in the $(r-1)^{th}$ synchronization period;

acquiring training learning rates of the N local recognition models in the $r^{th}$ synchronization period;

acquiring a model parameter difference between the target global model and the historical global model; and determining ratios of the model parameter difference to the training learning rates as federated momenta, and transmitting the federated momenta to the N clients, the federated momenta along with the target global model being for instructing the N clients to update parameters of the local recognition models associated with the target global model, and the federated momenta being for indicating training directions of the N local recognition models in the respective clients.

12. A data processing method, performed by a client, the method comprising:

in response to a number of times for training a target local recognition model satisfying a synchronization period, uploading local model parameters corresponding to the target local recognition model to a service device, whereby the service device obtains a target global model based on the local model parameters respectively uploaded by N clients, the local model parameters respectively uploaded by the N clients comprising the local model parameters corresponding to the target local recognition model, the target global model being determined by evaluation indexes of M alternative global models respectively in a multimedia verification data set, the M alternative global models being determined by M parameter fusion modes associated with a local model parameter set and the local model parameter set, the local model parameter set being determined based on the local model parameters respectively uploaded by the N clients, N being a positive integer greater than 1, and M being a positive integer greater than 1; and receiving the target global model from the service device;

updating parameters of the target local recognition model according to the target global model; and determining the parameter-updated target local recognition model as an object recognition model, the object recognition model being configured to recognize objects of a target object type contained in multimedia data.

13. The method according to claim 12, further comprising:

acquiring multimedia sample data, inputting the multimedia sample data into the target local recognition model, and outputting an object space feature corresponding to the multimedia sample data through the target local recognition model;

determining a training loss function corresponding to the target local recognition model according to tag information corresponding to the object space feature and the multimedia sample data; and determining a training gradient of the target local recognition model according to the training loss function, updating parameters of the target local recognition model according to the training gradient and a training learning rate corresponding to the target local recognition model, and statistically calculating the number of times for training the target local recognition model.

14. The method according to claim 12, wherein the multimedia data comprises a face image, and the target object type comprises a face type, and the method further comprises:

acquiring the face image, inputting the face image to the object recognition model, and outputting face space features corresponding to the face image through the object recognition model; and determining a face classification result corresponding to the face image according to the face space features, the face classification result representing an identity authentication result of an object of a face type contained in the face image.

15. An apparatus for processing data, comprising:

a memory operable to store computer-readable instructions; and a processor circuitry operable to read the computer-readable instructions, the processor circuitry when executing the computer-readable instructions is configured to:

acquire local model parameters respectively corresponding to N local recognition models, the N local recognition models being obtained respectively by N clients performing independent training, each of the N clients comprising multimedia sample data for training the associated local recognition model, the multimedia sample data containing objects of a target object type, and N being a positive integer greater than 1;

acquire M parameter fusion modes associated with a local model parameter set, and perform parameter fusion on the local model parameter set respectively according to each of the M parameter fusion modes, so as to obtain M alternative global models, the local model parameter set being determined based on the local model parameters respectively corresponding to the N local recognition models, and M being a positive integer greater than 1;

acquire evaluation indexes of the M alternative global models respectively in a multimedia verification data set;

determine a target global model in the M alternative global models according to the evaluation indexes; and transmit the target global model to the N clients, whereby the N clients update parameters of a local recognition model associated with the target global model according to the target global model respectively, so as to obtain an object recognition model, the object recognition model being configured to recognize objects of a target object type contained in multimedia data.

16. The apparatus according to claim 15, wherein a parameter fusion mode is implemented based on a weight combination, and the processor circuitry is configured to:

acquire M weight combinations associated with the local model parameter set; and perform the parameter fusion on the local model parameter set respectively according to each of the M weight combinations, so as to obtain the M alternative global models, each of the M weight combinations comprising a training influence weight respectively corresponding to each of local model parameters in the local model parameter set.

17. The apparatus according to claim 16, wherein the M weight combinations comprise a weight combination i, i being a positive integer less than or equal to M, the processor circuitry is configured to:

perform weighted mean on a training influence weight contained in the weight combination i and the local model parameters contained in the local model parameter set to obtain a fused model parameter; and determine a recognition model carrying the fused model parameter as an alternative global model i associated with the weight combination i.

18. The apparatus according to claim 15, wherein the processor circuitry is configured to:

Acquire the multimedia verification data set containing positive sample pairs and negative sample pairs, the positive sample pairs referring to multimedia sample data pairs containing the same object, and the negative sample pairs referring to multimedia sample data pairs containing different objects;

input the positive sample pairs to an alternative global model i in the M alternative global models, and output first object prediction results of the positive sample pairs through the alternative global model i, i being a positive integer less than or equal to M;

input the negative sample pairs to the alternative global model i, and output second object prediction results of the negative sample pairs through the alternative global model i; and determine an evaluation index of the alternative global model i in the multimedia verification data set according to the first object prediction results and the second object prediction results.

19. The apparatus according to claim 15, wherein the processor circuitry is configured to:

acquire the multimedia verification data set containing positive sample pairs and negative sample pairs, the positive sample pairs referring to multimedia sample data pairs containing the same object, and the negative sample pairs referring to multimedia sample data pairs containing different objects;

acquire a false acceptance rate of an alternative global model i contained in the M alternative global models in the multimedia verification data set, and determine a similarity threshold in a similarity corresponding to the negative sample pairs, the similarity threshold being determined by the number of the negative sample pairs and the false acceptance rate, and i being a positive integer less than or equal to M; and acquire a similarity corresponding to the positive sample pairs, and acquire first sample pairs having a similarity greater than the similarity threshold in the positive sample pairs, and determine a ratio of the number of the first sample pairs to the number of the positive sample pairs as the evaluation index of the alternative global model i in the multimedia verification data set.

20. The apparatus according to claim 15, wherein the target global model is generated based on N local model parameters corresponding to an $r^{th}$ synchronization period, r being a positive integer, and the processor circuitry is further configured to:

acquire a historical global model corresponding to an $(r-1)^{th}$ synchronization period, the historical global model being generated based on local model parameters uploaded by the N clients respectively in the $(r-1)^{th}$ synchronization period;

acquire training learning rates of the N local recognition models in the $r^{th}$ synchronization period;

acquire a model parameter difference between the target global model and the historical global model; and determine ratios of the model parameter difference to the training learning rates as federated momenta, and transmit the federated momenta to the N clients, the federated momenta along with the target global model being for instructing the N clients to update parameters of the local recognition models associated with the target global model, and the federated momenta being for indicating training directions of the N local recognition models in the respective clients.

* * * * *